(12) United States Patent
O'Brien et al.

(10) Patent No.: US 9,678,942 B2
(45) Date of Patent: Jun. 13, 2017

(54) METHODS FOR GENERATING PHRASES IN FOREIGN LANGUAGES, COMPUTER READABLE STORAGE MEDIA, APPARATUSES, AND SYSTEMS UTILIZING SAME

(71) Applicant: Smigin LLC, New York, NY (US)

(72) Inventors: Susan Caroline O'Brien, New York, NY (US); Nicholas Andrew Law, Brooklyn, NY (US)

(73) Assignee: SMIGIN LLC, New York, NY (US)

( * ) Notice: Subject to any disclaimer, the term of this patent is extended or adjusted under 35 U.S.C. 154(b) by 0 days.

(21) Appl. No.: 14/620,956

(22) Filed: Feb. 12, 2015

(65) Prior Publication Data

US 2015/0227511 A1    Aug. 13, 2015

Related U.S. Application Data

(60) Provisional application No. 61/939,011, filed on Feb. 12, 2014.

(51) Int. Cl.
*G06F 17/28* (2006.01)
*G06F 17/27* (2006.01)

(52) U.S. Cl.
CPC ........ *G06F 17/274* (2013.01); *G06F 17/2872* (2013.01); *G06F 17/2881* (2013.01)

(58) Field of Classification Search
CPC ............. G06F 17/30672; G06F 17/271; G06F 17/2872; G06F 17/274; G06F 17/2881

USPC .................................................. 704/2, 4, 7, 9
See application file for complete search history.

(56) References Cited

U.S. PATENT DOCUMENTS

| | | | |
|---|---|---|---|
| 6,233,545 B1* | 5/2001 | Datig | G06N 3/004 704/2 |
| 7,085,707 B2* | 8/2006 | Milner | G09B 19/08 704/2 |
| 7,407,384 B2* | 8/2008 | Raya | G09B 19/04 434/156 |
| 2003/0065503 A1* | 4/2003 | Agnihotri | G06F 17/2705 704/7 |
| 2008/0195375 A1* | 8/2008 | Clifton | G06F 17/2872 704/4 |
| 2014/0236571 A1* | 8/2014 | Quirk | G06F 17/271 704/9 |

\* cited by examiner

*Primary Examiner* — Charlotte M Baker
(74) *Attorney, Agent, or Firm* — Dorsey & Whitney LLP

(57) ABSTRACT

A system including at least one processing unit and a memory encoded with instructions that, when executed by the at least one processing unit, cause the at least one processing unit to cause a plurality of first terms in a native language to be displayed on a screen; receive a selection of a first term and translate it into a first target term in a target language, and use grammatical rules to determine a plurality of second terms that are grammatically compatible with the first term; display the plurality of second terms; receive a selection of a second native term; use the grammatical rules to translate the second term into a second target term based on the first target term and the second term; and build a phrase in the target language based on the first and second target terms, the phrase being grammatically correct in the target language.

22 Claims, 14 Drawing Sheets

METHODS FOR GENERATING PHRASES IN FOREIGN LANGUAGES, COMPUTER READABLE STORAGE MEDIA, APPARATUSES, AND SYSTEMS UTILIZING SAME

CROSS REFERENCE TO RELATED APPLICATION(S)

This application claims the benefit of the earlier filing date of U.S. Provisional Application 61/939,011 filed Feb. 12, 2014, which provisional application is hereby incorporated by reference in its entirety for any purpose.

TECHNICAL FIELD

Embodiments of the disclosed invention relate generally to language translation, and more particularly, in one or more illustrated embodiments, to generating phrases in one or more foreign languages.

BACKGROUND

One of the greatest challenges with existing digital translators is that they often don't deal well with language-specific grammar peculiarities, and often make embarrassing errors with longer phrases. Translating from English to Chinese, for instance, may result in an incorrect ordering of words.

The set of examples is provided by way of illustrating example implementations to aid in understanding and is not intended to, nor should it be interpreted as, limiting in any way.

DETAILED DESCRIPTION

Certain details are set forth below to provide a sufficient understanding of embodiments of the invention. However, it will be clear to one skilled in the art that embodiments of the invention may be practiced without various aspects of these particular details. In some instances, well-known circuits, control signals, timing protocols, computer system components, and software operations have not been shown in detail in order to avoid unnecessarily obscuring the described embodiments of the invention.

Embodiments of the present invention pertain generally to language translation, and in particular, to generating phrases in foreign languages. In one aspect of the invention, a multilingual software application may be implemented on any suitable computing device, such as a smartphone or tablet to help users generate (e.g., build) everyday phrases. Briefly, a user iteratively selects portions (e.g., terms) of phrases in a known language, and an equivalent phrase in a desired language is provided with correct grammar. Users in examples described herein may include human actors in some examples and/or computerized processes in some examples. As described herein, phrases may be generated in a manner that minimizes or prevents inadvertent grammatical errors. In this manner, embodiments of the present invention may enable a user to quickly (e.g., instantly) deliver accurate customized phrases that can be used in everyday life, for instance, while traveling for business or for pleasure.

Figure 1:
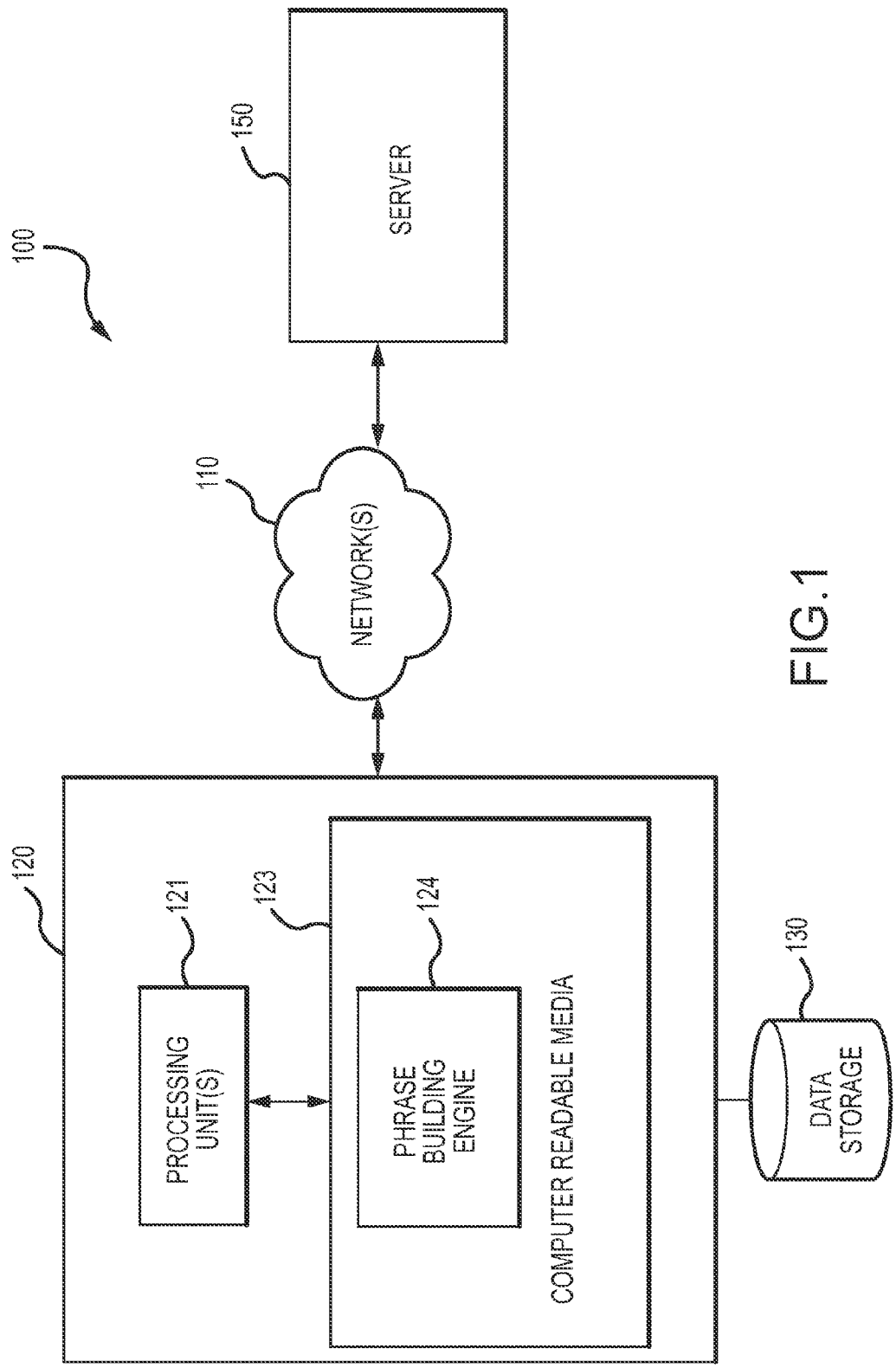
FIG. 1 is a schematic illustration of a phrase building system according to an embodiment of the invention.

FIG. 1 illustrates a phrase building system 100 according to an embodiment of the present invention. The phrase building system 100 may include a network 110, a computing device 120, a data storage 130, and a server 150.

The computing device 120 may comprise any computing device known in the art, including but not limited to, a modem, a router, a gateway, a server, a thin client, a laptop, a desktop, a computer, a tablet, a media device, a smart phone, cellular phone or other mobile device, or any combination or sub-combination of the same. The computing device 120 may include one or more processing units 121 and computer readable media 123. The computer readable media 123 may be encoded with executable instructions that may operate in conjunction with one or more processing units 121 of the computing device 120 to provide functionality allowing execution of one or more instructions, such as those included in a phrase building engine 124. Although the executable instructions for the phrase building engine 124 are shown on a same computer readable media 123, in some embodiments any or all sets of instructions may be provided on multiple computer readable media and may not be resident on the same media. Accordingly, computer readable media 123 as used herein includes one or more computer readable media 123. Computer readable media 123 may include any form of computer readable storage or computer readable memory, transitory or non-transitory, including but not limited to externally or internally attached hard disk drives, solid-state storage (e.g., NAND flash or NOR flash media), tiered storage solutions, storage area networks, network attached storage, and/or optical storage.

As described, the instructions stored on the computer readable media 123 may be executed using the one or more processing units 121, or other processing units. The executable instructions for the phrase building engine 124 may be referred to as a "phrase building engine" herein, where the "phrase building engine" refers to the executable instructions for a phrase building engine 124 and the one or more of the processing units 121 or other processing units used to execute the instructions to perform the actions described.

Data storage 130 may be accessible to the phrase building engine for storage of data provided (e.g., generated) or received by the phrase building engine. Data storage 130 may store grammatical rules used by the phrase building engine 124 in some examples. Data storage 130 may further store attributes of various terms in a variety of languages (e.g. part of speech, conjugation), such that the phrase building engine 124 may generate grammatically correct terms as described in examples herein. In some embodiments, data storage 130 may be included in computer readable media 123, however, data storage 130 may also be stored in other locations, such as on a disk accessible to the phrase building engine.

The computing device 120 may be configured to communicate over the network 110 with any number of devices, including but not limited to the other components of the phrase building system 100 described herein. The network 110 may comprise one or more networks, such as local area networks (LANs), wide area networks (WANs), metropolitan area networks (MANs), cellular networks, and/or the Internet. Communications provided to, from, and within the network 110 may be wired and/or wireless, and further may be provided by any networking devices known in the art, now or in the future. Devices communicating over the network 110 may communicate with any communication protocol, including, but not limited to, TCP/IP, UDP/IP, RS-232, and any member of IEEE 802.11.

The server 150 may comprise a server configured to provide data (e.g., language data) to and/or receive from data from the computing device 120. In some embodiments, for example, the server 150 may be configured to stream, transmit, or otherwise provide data to the computing device 120 such that the data may be utilized by the computing device 120. The server 150 may further manage registration of users of the phrase building engine, or any other online functionality provided by use of the phrase building engine. Accordingly, data provided by the server 150 may include, for instance, user registration data, user subscription data, user preference data, language data (e.g., language packs), translation data, location data, cultural data (e.g., facts about user location), visual data (e.g., video, photos), auditory data (e.g., voice), update data, or any combination thereof.

In at least one example, the phrase building engine may include an application having a multi-step, interactive user interface which enables a user to build phrases in a foreign language of choice using sets of pre-determined keywords, verbs, and nouns in such a way that grammatical and/or translation errors are minimized or eliminated. In one embodiment, the phrase building engine may permit the user to generate phrases using a sequenced, linear method, whereby terms grammatically agree with one or more preceding selected terms. Because the phrase building engine may include instructions for enforcing correct grammar, a user of the computing device 120 need not be concerned with determining correct grammar during operation.

As described, the phrase building engine may operate on the computing device 120. In some examples, the phrase building engine may be stored on the computing device such that network activity is not required for the phrase building engine to operate. In other examples, the phrase building engine may require communication with the server 150, or any other server, to operate. This may, for instance, ensure only registered or otherwise authorized users operate the phrase building engine. In yet another example, the phrase building engine may be partially or fully stored on one or more other devices, such as the server 150, such that the phrase building engine operates as a cloud-based application. By way of example, a user may utilize a web browser to access the phrase building engine remotely.

Figure 2:
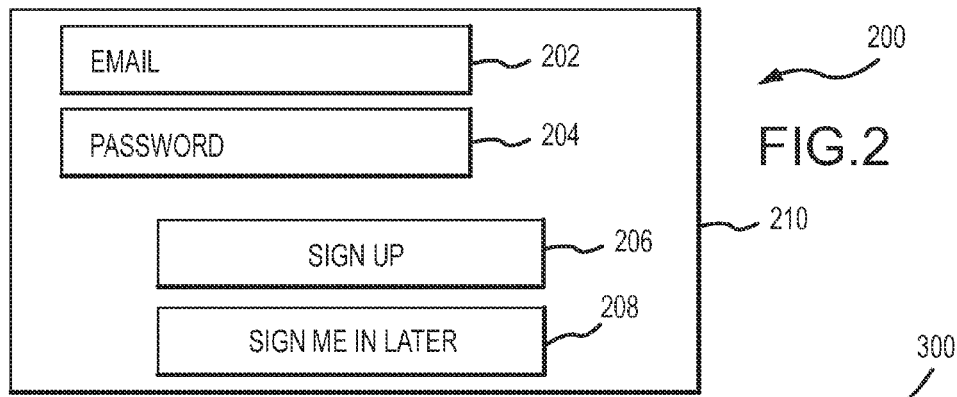
FIG. 2 shows a screenshot of an exemplary sign-in user interface according to an embodiment of the invention.

When the phrase building engine 124 is launched, it may initiate a sign-in stage and execute instructions for signing a user in, the details of which are described below with reference to FIG. 13. During the sign-in stage, a sign-in user interface 200 may be presented to the user. FIG. 2 shows a screenshot of an exemplary sign-in user interface 200 displayed on a screen 210 of a user's computing device 120. The sign-in user interface 200 may include an email field 202 for receiving a user's email and a password field 204 for receiving a user's password, in order to sign in the user. If a user has not yet registered with the phrase building engine 124, then the user can click a "sign up" button 206, which will then take the new user to a registration page. The sign-in user interface 200 can also include a "sign me in later" button 208, which will allow a user to launch the phrase building engine 124 without signing in and thus without having the phrase building engine 124 apply user preferences.

The phrase building engine 124 can store (e.g., in data storage 130) various user preferences associated with a user. Thus, when the user is signed in, the phrase building engine 124 may retrieve the user's user preferences and apply them when executing the phrasebuilding instructions. For example, when registering, a user can indicate that his or her native language is English. Thus, when the user signs in, the phrase building engine 124 will launch using English as the native language.

Also, user preferences may be entered (by the user and/or automatically added by the phrase building engine 124) at various stages of the phrasebuilding application. For example, a user can store one or more "favorite phrase" or "favorite theme," the details of which are described below with reference to FIGS. 9 and 10.

Typically, the phrase building engine 124 is initiated in a native language, such as English. In at least one embodiment, the phrase building engine 124 may be deployed in the native language of an "app store" from which the phrase building engine is obtained, but a user may choose to deploy the phrase building engine in a different native language. For example, if a user downloads the phrase building engine from a United States App Store, the phrase building engine 124 may typically deploy with English as a native language. A user preferring Spanish as native language may override this selection, and change the native language to Spanish. For example, a user may select Spanish as the native language when registering.

Figure 3:
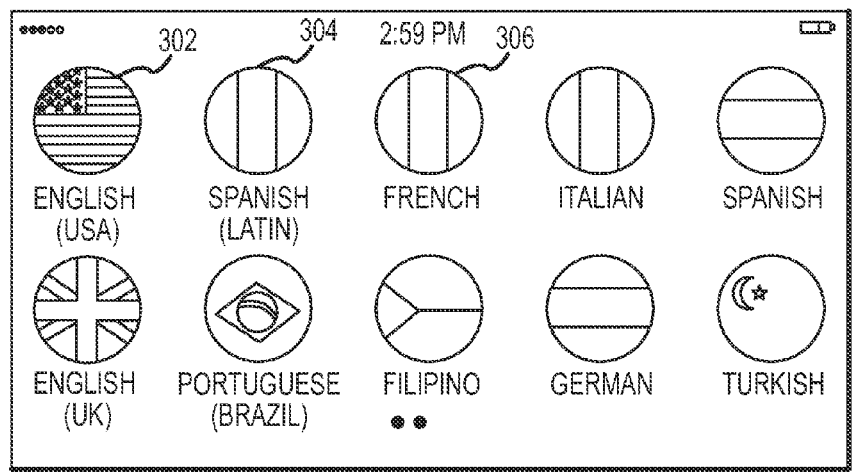
FIG. 3 shows a screenshot of an exemplary language selection user interface according to an embodiment of the invention.

In an example operation of the phrase building engine 124, a user initiates execution of the phrase building engine on the computing device 120, and chooses a target language, which is a foreign language different from the native language selected by the user. FIG. 3 shows a screenshot of an exemplary language selection user interface 300 for receiving user input to determine a target language. The language selection user interface 300 can include buttons 302, 304, 306 each indicating a particular target language. For example a user could click on a "French" button 306 to cause the phrase building engine 124 to establish French as the target language. Those in the art will appreciate that buttons 302, 304, 306 are exemplary, and the language selection user interface 300 could employ any functionality for allowing a user to choose a target language. For example, in some embodiments, the language selection interface 300 could include a field in which a user could type a particular target language.

In some embodiments, the phrase building engine 124 may automatically determine a target language without receiving user input. For example, the phrase building engine 124 may include GPS functionality to determine a location of the computing device 120, may determine the most common language spoken in the location, and then establish such language as the target language. Also, the phrase building engine 124 may include a language recognition functionality to determine which language someone speaking, and then establish such language as the target language.

Figure 4:
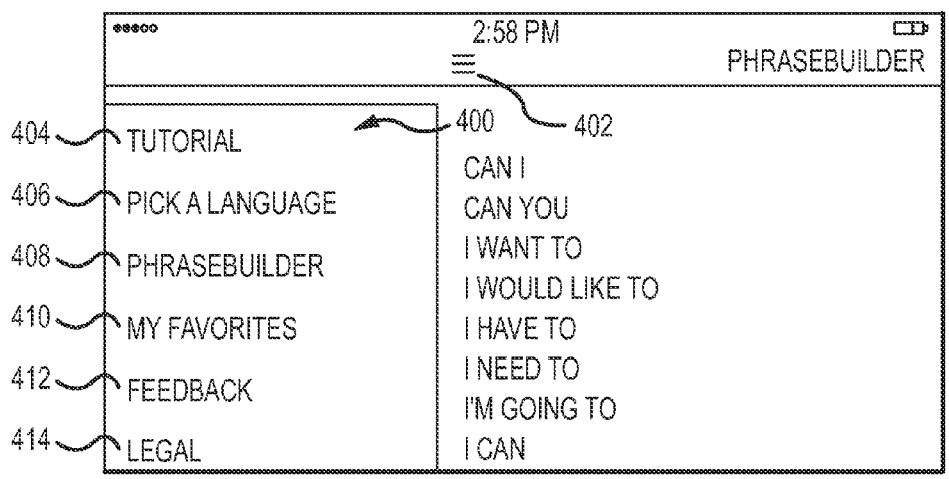
FIG. 4 shows a screenshot of an exemplary menu user interface and a portion of an exemplary phrasebuilding user interface according to an embodiment of the invention.

Once the target language is selected, the user may be automatically directed to a phrasebuilding interface 500, as shown in FIGS. 5A-D, the details of which are described below. If a user wants to return to the language selection interface 300 (e.g., to select a different target language), a menu interface 400 may allow the user to switch functionalities. As shown in FIG. 4, the phrasebuilding interface 500 may include a menu button 402, activation of which will cause the phrase building engine 124 to present the menu interface 400. Through the menu interface 400, the user can click a "pick a language" button 406 to cause the phrase building engine 124 to display the language selection interface 300. The menu interface 300 can include any type of button while remaining within the scope of this disclosure. For example, the menu interface 300 may include a "tutorial" button 404 to prompt an automated tour of the application (e.g., a swipe-through tour); a "phrasebuilder" button 408 to cause presentation of the phrasebuilding user interface 500; a "my favorites" button 410 to cause presentation of a favorites user interface (see FIG. 9); a "feedback" button 412 to allow users to send feedback to managers of the application; a "legal" button 414 to allow users to read legal information about the application; etc.

Turning now to FIGS. 5A-5D, shown are various screenshots of an exemplary phrasebuilding user interface 500, for which the phrase building engine 124 executes phrasebuilding instructions. As described in detail below, a user may use the phrasebuilding interface 500 to navigate through a series of pluralities of native language terms (e.g., 508, 510, 516) to generate a phrase. Navigating through the series of pluralities of terms (e.g., 508, 510, 516) may include selecting one or more terms from each of the plurality of terms (e.g., 508, 510, 516) to generate a phrase.

Figure 5A:
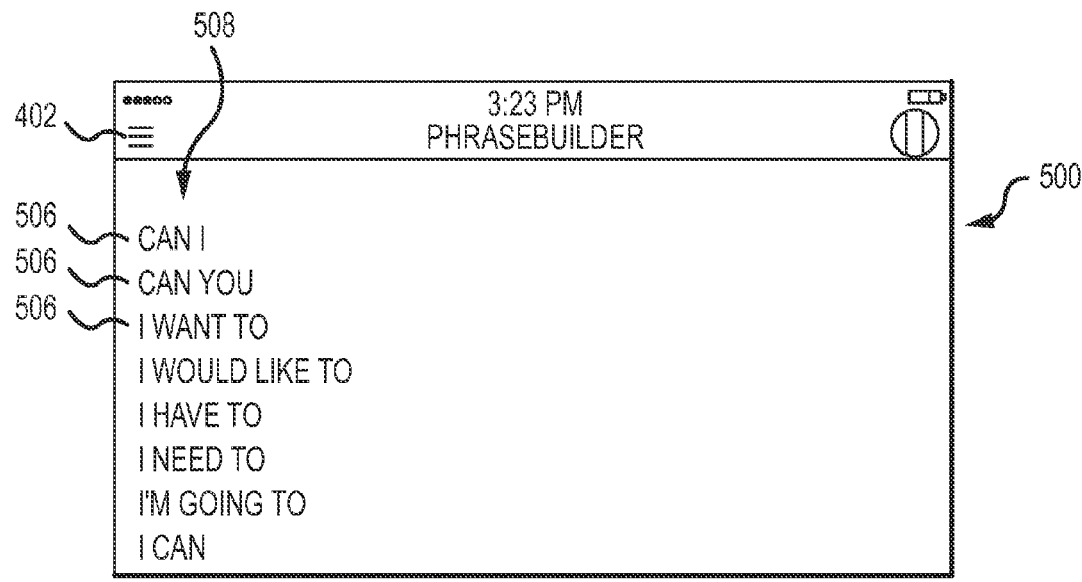
FIGS. 5A-5D show screenshots of an exemplary phrasebuilding user interface during a phrasebuilding stage according to an embodiment of the invention.

FIGS. 5A-5D show an exemplary implementation of the executable phrasebuilding instructions where the native language is English and the target language is French. As seen in FIG. 5A, the phrase building engine 124 can present to a user a first plurality of native language terms 508. As shown in FIG. 5A, the first plurality of native terms 508 can be in the form of a column or a vertically extending list, although this disclosure is in no way limited thereto. The first plurality of native terms 508 may include terms for beginning a phrase in the user's native language. The terms 506 in the first plurality of terms 508 may indicate intent (e.g., "I want to"). A native term 506 can have any number of words (e.g., native term 506 "can I" has two words, and native term 506 "I want to," has three words). As shown in FIG. 5E, a user can select a first native term 512 of the first plurality of native terms (e.g., by tapping on the first native term 512 via a touchscreen user interface).

In some embodiments, the phrase building engine 124 shows the same first plurality of native language terms 508 in the same order (e.g., in alphabetical order) each time the phrasebuilding instructions are executed. In some embodiments, the order of the plurality of native language terms 508 can change from one execution of the phrasebuilding instructions to another. For example, the phrase building engine 124 may store a user's selection of a first native term 512 (e.g., in the data storage 130 along with the user's preferences), and the next time the user initiates the phrasebuilding interface 500, the phrase building engine 124 can retrieve the selected term 512 and present the selected term 512 at or near the beginning of the plurality of native language terms 508. The phrase building engine 124 may track a user's selections over multiple initiations of the phrase building engine, and could determine the user's most recently selected terms 512 and/or more commonly selected terms 512, and may present such terms 512 at or near the beginning of the first plurality of native language terms 508. The phrase building engine 124 may allow a user to select (e.g., via the user registration interface) which particular native terms 506 are included in the first plurality of native terms 508 and/or an order of such native terms 506. For example, the phrase building engine 124 may provide the user with an "edit first plurality of native terms 508" functionality, which may allow a user to add and/or remove terms 506 from the first plurality 508, and/or may allow a user to rearrange an order of the particular terms 506 in the first plurality 508. As described in detail below with reference to FIG. 10, the particular native terms 506 included in the first plurality of native terms 508, and/or the order of such terms 506, may be determined based on a user's selection of a theme.

Figure 5B:
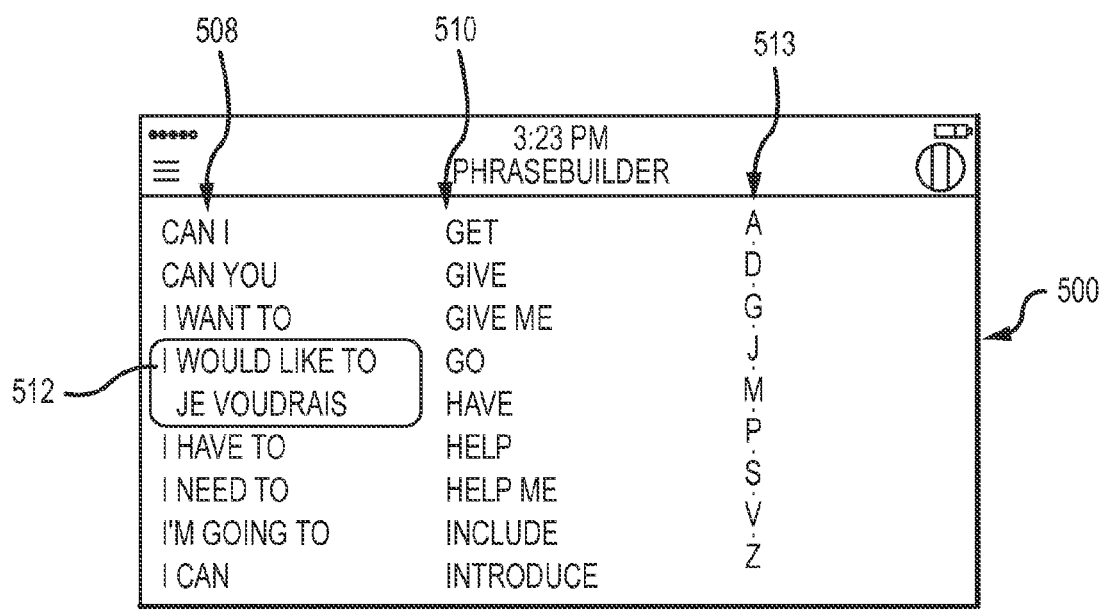

As shown in FIG. 5B, in some embodiments, when a user selects a first native term 512, the phrase building engine 124 may translate the first native term 512 into the target language. The phrase building engine 124 can show the translation of the first native term 512 (e.g., the first target term) with the first native term 512. For example, FIG. 5B shows that "je voudrais" (the translation of "I would like to" in French) is displayed beneath "I would like to."

Still referring to FIG. 5B, when a user selects a first native term 512 of the first plurality of native terms 508, the phrase building engine causes a second plurality of native terms 510 to be presented on the phrasebuilding interface 500. The second plurality of native terms 510 can be in the form of a column or a vertically extending list, although this disclosure is in no way limited thereto. In some embodiments, each of the second plurality of native terms 510 is grammatically compatible with the first native term 512. The second plurality of native terms 510 can be grammatically correct verbs (correct grammatical conjugation to work appropriately with the first native term 512). Grammatical rules may mean structural rules and/or policies governing the linguistics of a natural language. Grammatically compatible terms may mean terms in a natural language that together comply with the grammatical rules for the language.

The phrase building system 100 may store (e.g., in the data storage 130) grammatical rules for each of the native and target languages implemented by the phrase building engine 124. The phrase building engine 124 may enforce the grammatical rules in executing the phrasebuilding instructions. Grammatical rules may be stored in a database (e.g., in the data storage 130) with hierarchies usable by the phrase building engine 124 to determine correct term association and correct display. For example, the phrasebuilding instructions may cause the phrase building engine 124 to determine the second plurality of native terms 510 according to hierarchies, which may be based on the structural rules and/or policies governing the linguistics of the native language.

Figure 5C:
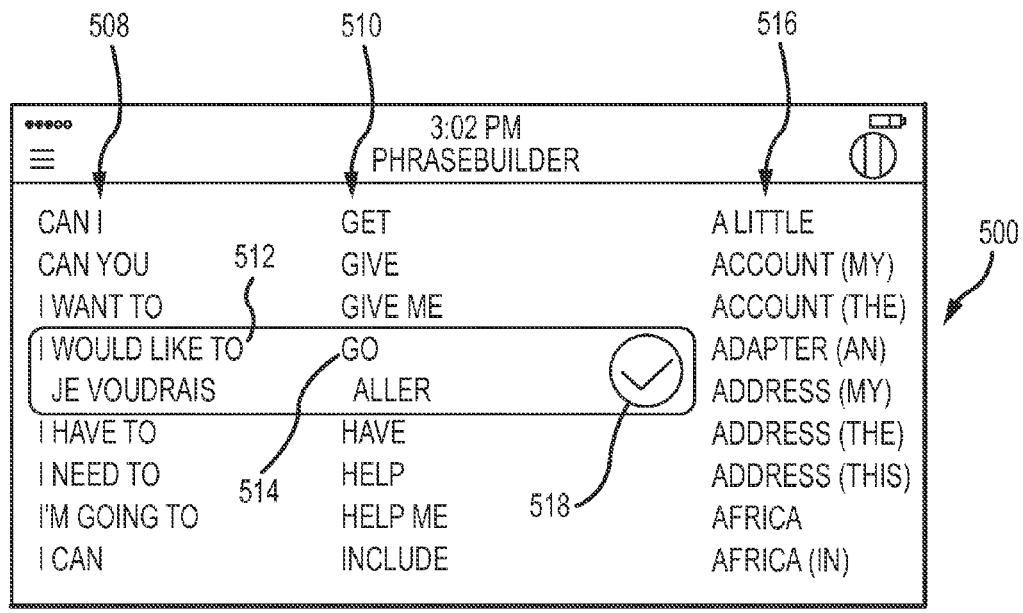

In some embodiments, the phrase building engine 124 determines which terms are included in the second plurality of native terms 510 based on the user's selection of the first native term 512. In other embodiments, the second plurality of native terms 508 may be presented, independently of which first native term 512 was selected. For example, the phrasebuilding engine 124 can display a second plurality of native language terms 510 that all include a particular class of words. For example, FIG. 5C shows a second plurality of native terms 510 that all include a verb. In some embodiments, the second plurality of native terms 510 may be verbs commonly used for business and/or leisure In cases where the second plurality of terms 510 is provided as an alphabetized list, the phrasebuilding interface 500 may include an alphabetic scroll 513 to allow a user to tap on the letter "s," for example, to navigate to the portion of the list 510 where the native terms begin with the letter "s." As shown in FIG. 5C, a user can select a second native term 514 of the second plurality of native terms 510 (e.g., by tapping on the second native term 514.

In some embodiments, the phrase building engine 124 shows the same second plurality of native language terms 510 in the same order (e.g., in alphabetical order) each time the phrasebuilder instructions are executed. In some embodiments, the order of the plurality of native language terms 510 can change from one initiation to another. For example, the phrase building engine 124 may store a user's selection of a second native term 514 (e.g., in the data storage 130 along with the user's preferences), and the next time the user initiates the phrasebuilding interface 500, the phrase building engine 124 can retrieve the selected term 514 and present the selected term 514 at or near the beginning of the second plurality of native language terms 510. The phrase building engine 124 may track a user's selections over multiple initiations of the phrase building engine, and could determine the user's most recently selected second native terms 514 and/or most commonly selected second native terms, and may present such term or terms at or near the beginning of the second plurality of native language terms 510. The phrase building engine 124 may allow a user to select (e.g., via the user registration interface) which particular native terms are included in the second plurality of native terms 510 and/or an order of such native terms. For example, the phrase building engine 124 may provide the user with an "edit second plurality of native terms 510" functionality, which may allow a user to add and/or remove terms from the second plurality 510, and/or may allow a user to rearrange an order of the particular terms in the second plurality 510. As described in detail below with reference to FIG. 10, the particular native terms included in the second plurality of native terms 510, and/or the order of such terms, may be determined based on a user's selection of a theme.

As shown in FIG. 5C, in some embodiments, when a user selects a second native term 514, the phrase building engine 124 may translate the second native term 514 into the target language. The phrase building engine 124 can show the translation of the second native term 514 (e.g., the second target term) with the second native term 514. For example, FIG. 5C shows that "aller" (the translation of "go" in French) is displayed beneath "go." The first and second target terms can be displayed in an aligned manner so that the user can see the translation of the first and second target terms together (e.g., "je voudrais aller"). As such, a user can see the translations of all the terms as they are selected and thus learn the target language in a more fluid manner.

Figure 5D:
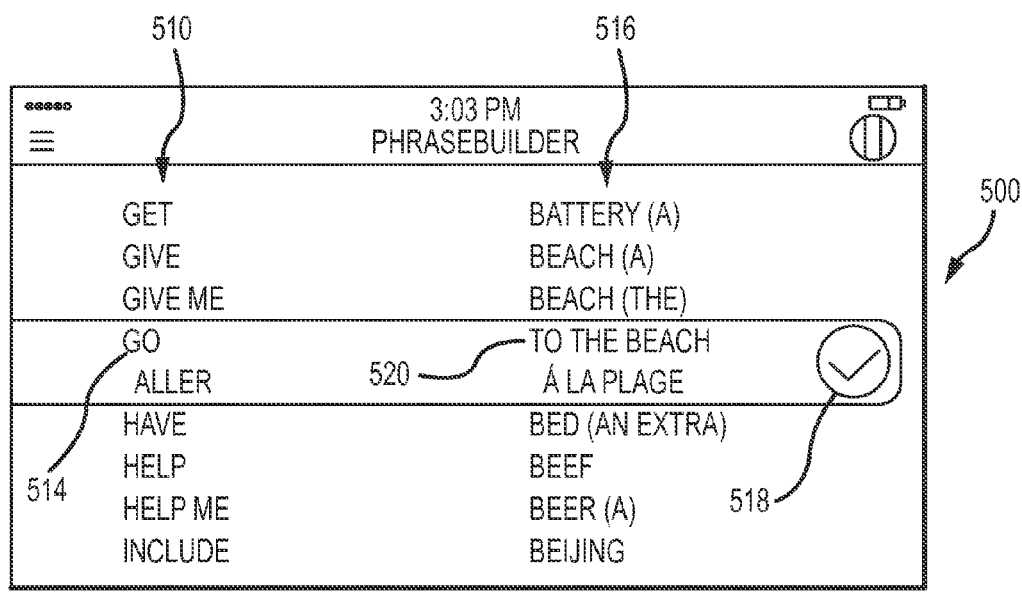

Still referring to FIG. 5C, upon receiving a user's selection of the second native term 514, the executable phrase-building instructions may cause a complete button 518 and a third plurality of native terms 516 to be displayed. If the user's phrase is complete after selecting only the first native term 512 and the second native term 514 (e.g., the user's complete phrase is "I would like to go"), then the user can activate the complete button 518. Details of activating the compete button 518 after selecting only first and second native terms 512, 514 is discussed below with reference to FIGS. 7A-8B. If, on the other hand, the user's phrase is not yet complete and the user would like to add one or more terms to the phrase, then, as seen in FIG. 5D, the user can select a third native term 520 from the third plurality of native terms 516. While first, second, and third pluralities of native terms 512, 514, 516 are shown, it should be well understood that the phrasebuilding interface 500 could include any number of pluralities of native terms (e.g., a fourth plurality of native terms, a fifth plurality of native terms, etc.) while remaining within the scope of this disclosure. For example, upon the user selecting the third native term 520, the phrasebuilding interface 500 could display the complete button 518 along with a fourth plurality of native terms (not shown), and a user could chose to activate the completion button 518 or could select a fourth native term from the fourth plurality of native terms. This could be repeated for a fifth plurality of native terms, a sixth plurality of native terms, and so on.

As shown in FIGS. 5C and 5D, the third plurality of native terms 516 can be in the form of a column or a vertically extending list, although this disclosure is in no way limited thereto. In some examples, the third plurality of native terms 516 may be terms that help further 'qualify' the users' phrase. The third plurality of native terms 516 may comprise grammatically correct nouns with various iterations of noun+preposition, noun+possessive pronouns built in (correct grammatical conjugation to work appropriately with selections from the first and second pluralities 508, 510). For example, if the user wants to build a phrase using 'bag' as noun, the phrasebuilding user interface 500 may present the third plurality 516 of built-in grammatical options to choose from: my bag, my bags, a bag, the bags etc. The user can make an appropriate selection based on phrase requirement, which thus alleviates any grammatical translation errors.

In some embodiments, each term of the third plurality of native terms 516 is grammatically compatible with both the first native term 512 and second native term 514. For example, if a user selects "Where" and "is" from the first and second pluralities 508, 510, respectively, the phrase building engine 124 may determine that only singular nouns are grammatically compatible with the previous selections.

Thus, the phrase building engine 124 may cause the third plurality of terms 516 to include the "my key" but not "my keys." In some embodiments, singular nouns may be stored as being "compatible qualifiers" with the previous selection of grammatical terms "where" and "is." Also, if a user selects "where" and "are" from the first and second pluralities 508, 510, respectively, the phrase building engine 124 may determine that plural nouns are grammatically compatible with the previous selections. Thus, the phrase building engine 124 may cause the third plurality of native terms 516 to include "my keys" but not "my key." In some embodiments, plural nouns may be stored as being "compatible qualifiers" with the previous selection of grammatical terms "where" and "are."

The phrase building system 100 may store terms in a database (e.g., in the data storage 130) as being grammatically compatible with other particular terms. For example, True/False values may be used to indicate specific terms as having specific grammatical requirements. Values may then be assigned against each of these specific terms to indicate which correlating terms can be displayed prior to, or following, any of those terms, while being grammatically correct. For example, certain terms (e.g., action terms or verbs) in the second plurality of native terms 510 may be flagged as being incompatible (e.g., logically incompatible) with particular terms (e.g., keyword terms) in the first plurality of native terms 508. For example, the term 'Show me' may be flagged as being incompatible with the term 'Can I.' Thus, upon user selection of the term 'Can I' as the first native term 512, the phrase building engine 124 may determine to not display 'show me' as part of the second plurality of native terms 510.

The phrase building system 100 may store terms in a database (e.g., in the data storage 130) as subsets, and each subset may have its own set of rules. For example, the system 100 may store the terms using data tags to associate the terms with one another as being in a subset. Each specific term may belong to one or more subset. For example, a term "a menu" may be stored with a first data tag as being associated with terms that are predetermined for display in a Restaurant or Café "theme" (the details of which are described below with reference to FIG. 10). The same term "a menu" may also be stored with a second data tag indicating that it is a singular noun. Thus, the phrase building engine 124 may also display "a menu" with grammatically correct instances such, when "I want to" and "see" are selected from the first and second pluralities 508, 510, or when "Can I" and "see" are selected from the first and second pluralities 508, 510. However, the phrase building engine 124 may determine, based on one or more data tags associated with the term, to not display the term "a menu" if the user selects to build a phrase such as "I want to" and "buy," since the phrase "I want to buy a menu," is not logical.

In some examples, the phrase building engine 124 may limit terms provided to the user based on logic and the content of one or more of the user's selections. The phrase building engine 124 may have a predetermined logic based on compatible and non-compatible terms. For example, in some embodiments, the phrase building engine 124 determines which terms are included in the third plurality of native terms 516 based on the content of the user's selection of the first native term 512 and second native term 514. For example, while the phrase "I want to buy Africa" is grammatically correct, it is unlikely that a user would want or need to use this phrase. Accordingly, were a user to select "I want to" and "go to" from the first and second pluralities 508, 510, respectively, the phrase building engine 124 may present the user with a third plurality including the term "Africa." Conversely, were a user to select "I want to" and "buy," respectively, the phrase building engine 124 may omit the term "Africa" from the third plurality 516. As another example, if a user selects "I want to" and "buy," from the first and second pluralities 508, 510, respectively, the phrase building engine 124 may omit the term "my bag" from the third plurality of native terms 516, and may include the term "a bag" in the third plurality of native terms 516.

In some embodiments, the phrase building system 100 associates data flags when storing the terms, and the phrase building engine 124 uses the data flags when executing the phrase building instructions. For example, the data flags may be applied to certain terms in order to indicate a particular result if combined with specifically indicated terms selected by a user. For example, if a user selects "Where" and "is" from the first and second pluralities 508, 510, respectively, the combination may cause the phrase building engine 124 to display logically appropriate terms (e.g., "Madrid"), and also a plurality of singular nouns in the third plurality of native terms 516.

In some embodiments, the phrase building engine 124 may determine the third plurality of native terms 516 based on the first native term 512, irrespective of the second native term 514. In some embodiments, the phrase building engine 124 may determine the third plurality of native terms 516 based on the second native term 514, irrespective of the first native term 512.

In some embodiments, the phrase building engine may determine the third plurality of native terms 516 independently of which first native term 512 and second native term 514 were selected. For example, the phrasebuilding engine 124 can display a third plurality of native language terms 516 that all include a particular class of words. In some examples, the exclusion of particular terms from a plurality may be selectively enabled by a user.

As shown in FIG. 5D, a user can select a third native term 520 of the third plurality of native terms 516 (e.g., by tapping on the third native term 520).

In some embodiments, the phrase building engine 124 shows the same third plurality of native terms 516 in the same order (e.g., in alphabetical order) each time the phrasebuilder instructions are executed. In some embodiments, the order of the third plurality of native terms 516 can change from one initiation to another. For example, the phrase building engine 124 may store a user's selection of a third native term 516 (e.g., in the data storage 130 along with the user's preferences), and the next time the user initiates the phrasebuilding interface 500, the phrase building engine 124 can retrieve the selected term 520 and present the selected term 520 at or near the beginning of the third plurality of native terms 516. The phrase building engine 124 may track a user's selections over multiple initiations of the phrase building engine, and could determine the user's most recently selected third native terms 520 and/or most commonly selected third native terms, and may present such term or terms at or near the beginning of the third plurality of native terms 516. The phrase building engine 124 may allow a user to select (e.g., via the user registration interface) which particular native terms are included in the third plurality of native terms 516 and/or an order of such native terms. For example, the phrase building engine 124 may provide the user with an "edit third plurality of native terms 508" functionality, which may allow a user to add and/or remove terms from the second plurality 510, and/or may allow a user to rearrange an order of the particular terms in the third plurality of native terms 516. As described in detail below with reference to FIG. 10, the particular native terms included in the third plurality of native terms 516, and/or the order of such terms, may be determined based on a user's selection of a theme.

As shown in FIG. 5D, in some embodiments, when a user selects a third native term 520, the phrase building engine 124 may translate the third native term 520 into the target language. The phrase building engine 124 can show the translation of the third native term 520 (e.g., the third target term) with the third native term 520. For example, FIG. 5D shows that "a la plage" (the translation of "to the beach" in French) is displayed beneath "to the beach." The first, second, and third target terms can be displayed in an aligned manner so that the user can see the translation of the entire phrase, "je voudrais aller a la plage"), thereby facilitating the user in learning the target language.

Figure 6A:
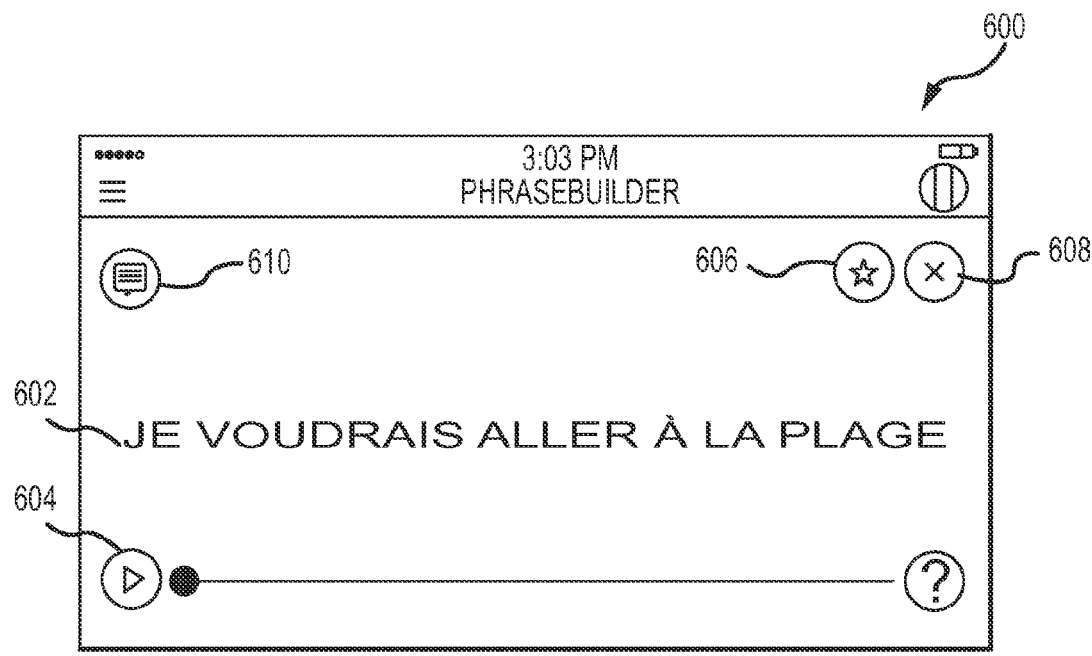
FIGS. 6A-6B show screenshots of an exemplary phrase user interface during a final phrase stage, following the phrasebuilding stage of FIGS. 5A-5D, according to an embodiment of the invention.
Figure 6B:
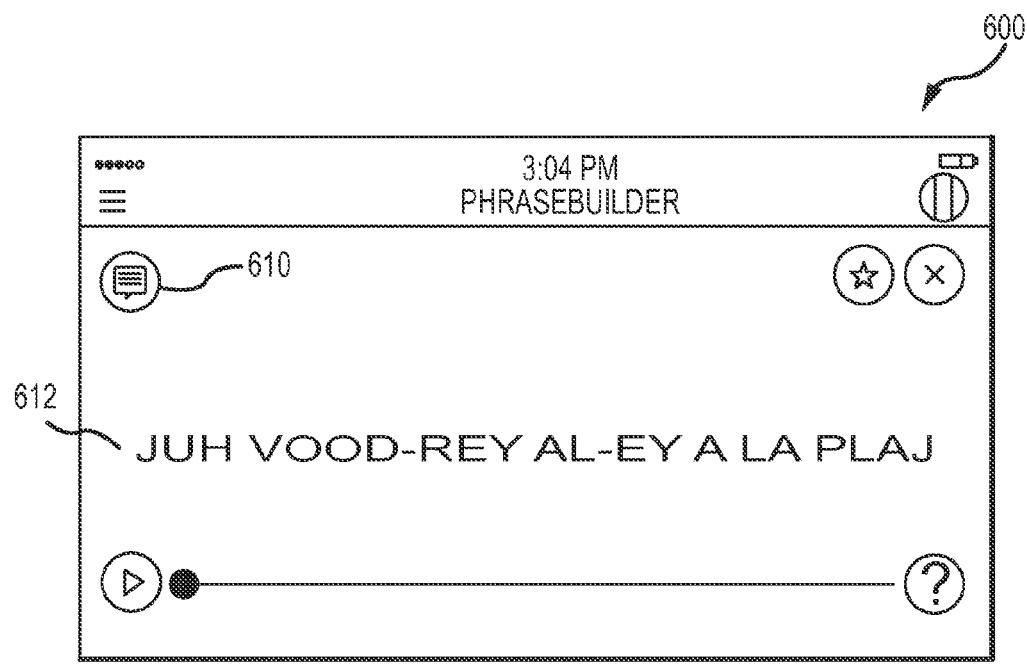

Still referring to FIG. 5D, upon receiving a user's selection of the third native term 520, the executable phrase-building instructions may cause a complete button 518 to be displayed (and, in some embodiments, a fourth plurality of native terms). Upon the user activating the complete button, the phrase building engine 124 presents a final phrase interface 600 to the user, as shown in FIGS. 6A and 6B. The final phrase interface 600 can present the final phrase 602 in the target language based on all of the user's selections of native terms. For example, 6A shows "Je voudrais aller a la plage," which is composed of the user's first native term 508 ("I would like to," which the phrase building engine 124 translated into "Je voudrais"), second native term 510 ("go," which the phrase building engine 124 translated into "aller"), and third native term 514 ("to the beach," which the phrase building engine 124 translated into "a la plage"), In the case illustrated in FIGS. 6A and 6B, the final phrase did not need to be modified. In other cases, however, the phrase building engine 124 may use grammar enforcing rules to modify the individual target language terms, in order to make the final phrase grammatically correct.

The final phrase interface 600 may include an audio button 604, activation of which may cause an audio recording of the final phrase 602 to sound (e.g., on a speaker associated with the computing device 120). For example, activation of the audio button 604 may cause the phrase building engine 124 to execute instructions for playing a recording of the final phrase 602. The instructions for playing an audio file may cause the phrase building engine 124 to retrieve one or more audio files (e.g., from the data storage 130) associated with the final phrase 602. In some embodiments, each target language term has its own file. For example, the first target language term "je voudrais" may be stored as an audio file, the second target language term "aller" may be stored as an audio file, and the third target language term "a la plage" may be stored as an audio file. In some embodiments, each word and/or portion of a word is stored as a separate audio file. In some embodiments, entire phrases (e.g., final phrases are stored as audio files.

In some embodiments, the instructions for playing an audio file cause the phrase building engine 124 to determine a particular order of words and/or terms. For example, in cases where each audio term is recorded and stored individually, some languages require multiple audio files for some terms. Take, for example, the English term "can I" that is used to form the phrase "can I X" and translated into Japanese." The English to Japanese translation of "Can I X" is "Watashi wa+X+kotoga dekimasuka." The English word "I" is "Watashi wa" in Japanese, and the word "can" is "kotoga dekimasuka" in Japanese. Thus, in this phrase, the term "can I" is split up, since "Watashi wa" is at the start of phrase, then the "X" (e.g., the verb/noun that the user selects) is in the middle, and "kotoga dekimasuka" is after the "X." Thus, "Watashi wa" can be recorded and stored separately from "kotoga dekimasuka." The executable instructions for playing audio recordings can determine the order of the words and play back the terms in the correct order.

The final phrase user interface 600 can includes a phonetic button 610, activation of which causes the final phrase 602 to be displayed phonetically, according to the user's native language. For example, FIG. 6B shows a phonetic presentation 612 of "je voudrais aller a la plage," which is, "juh vood-rey al-ey a la plaj."

The final phrase user interface 600 may include an exit button 608, activation of which will show a different interface. For example, when a user activates the exit button 608, the phrase building engine 124 may cause the phrasebuilding user interface 500 to be presented. The final phrase user interface 600 may include a favorites button 606, activation of which will cause the phrase building engine 124 to store the particular final phrase 602 as a "favorite phrase" 904 associated with the user, the details of which are described below with reference to FIG. 9.

Figure 7A:
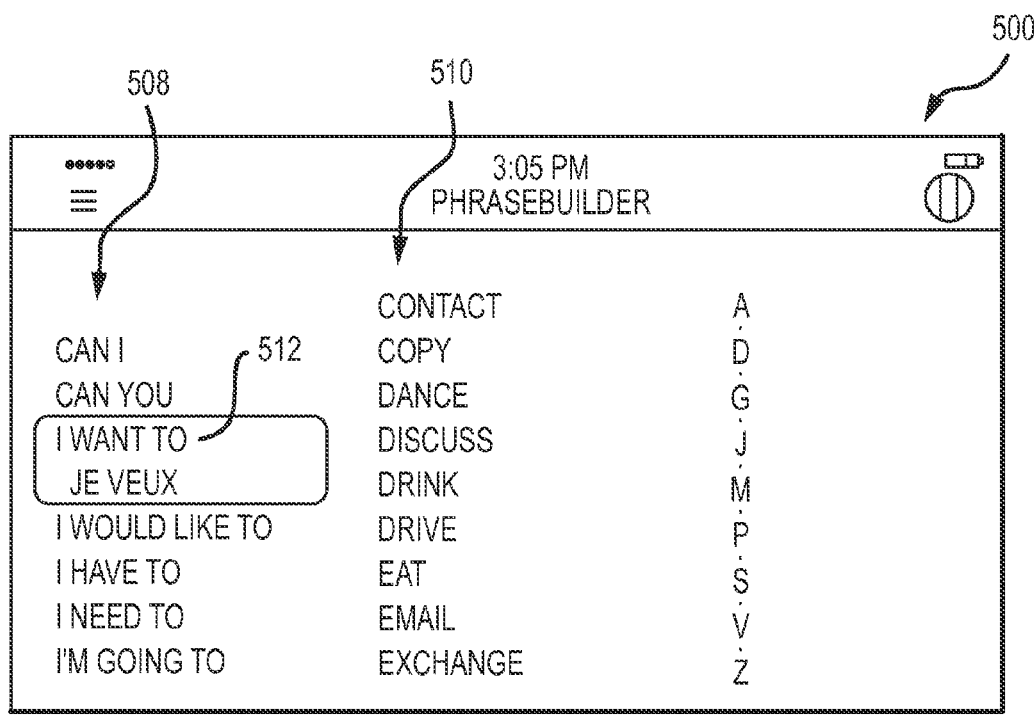
FIGS. 7A-7B show screenshots of an exemplary phrasebuilding user interface during a phrasebuilding stage according to an embodiment of the invention.
Figure 7B:
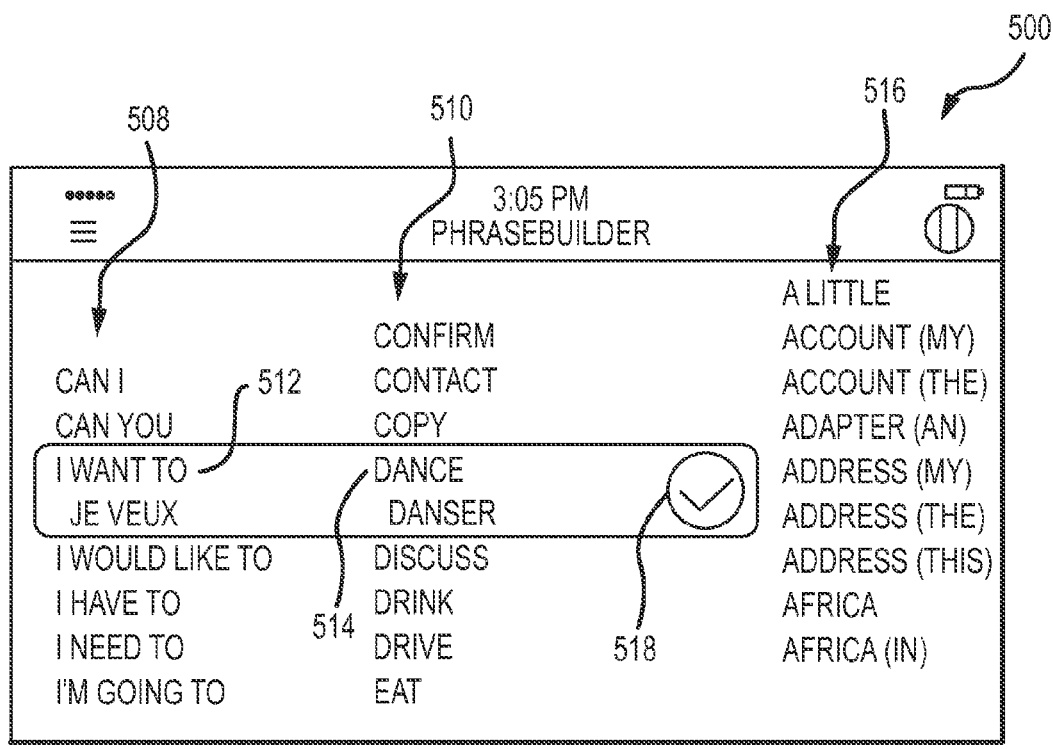
Figure 8A:
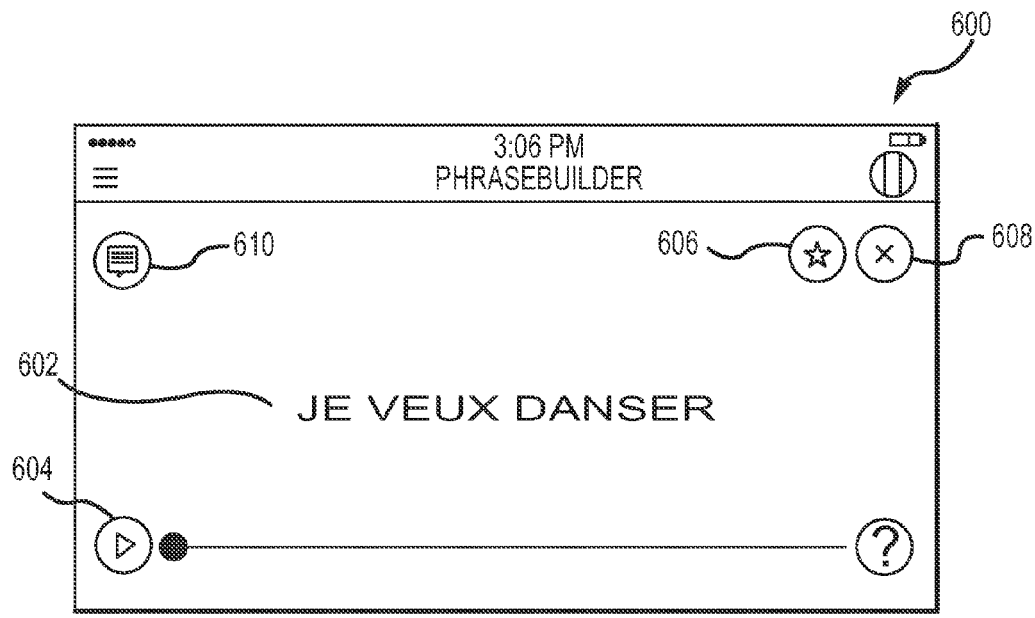
FIGS. 8A-8B show screenshots of an exemplary phrase user interface during a final phrase stage, following the phrasebuilding stage of FIGS. 7A-7B, according to an embodiment of the invention.
Figure 8B:
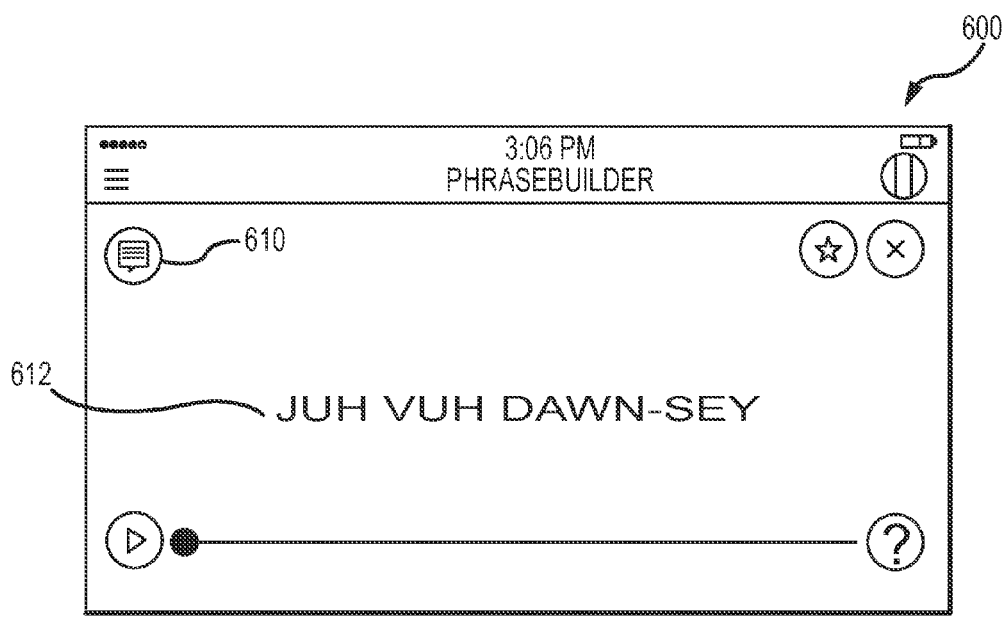

FIGS. 7A, 7B, 8A, and 8B show another implementation of the phrasebuilding interface 600, when a user selects the complete button 518 instead of selecting a term from the third plurality of native terms 516. Thus, as shown in FIG. 7B the user selected "I want to" as a first native term 512 and "dance" as a second native term 514, and then activated the compete button 518. As shown in FIG. 8A, upon the user activating the complete button 518, the phrase building engine 124 presents the final phrase screen 600 showing the French translation of "I want to dance," which is "Je veux danser." FIG. 8B shows the final phrase user interface 600 displaying the phonetic presentation of "je veux danser," for example, after a user has activated the phonetic button 610.

Figure 9:
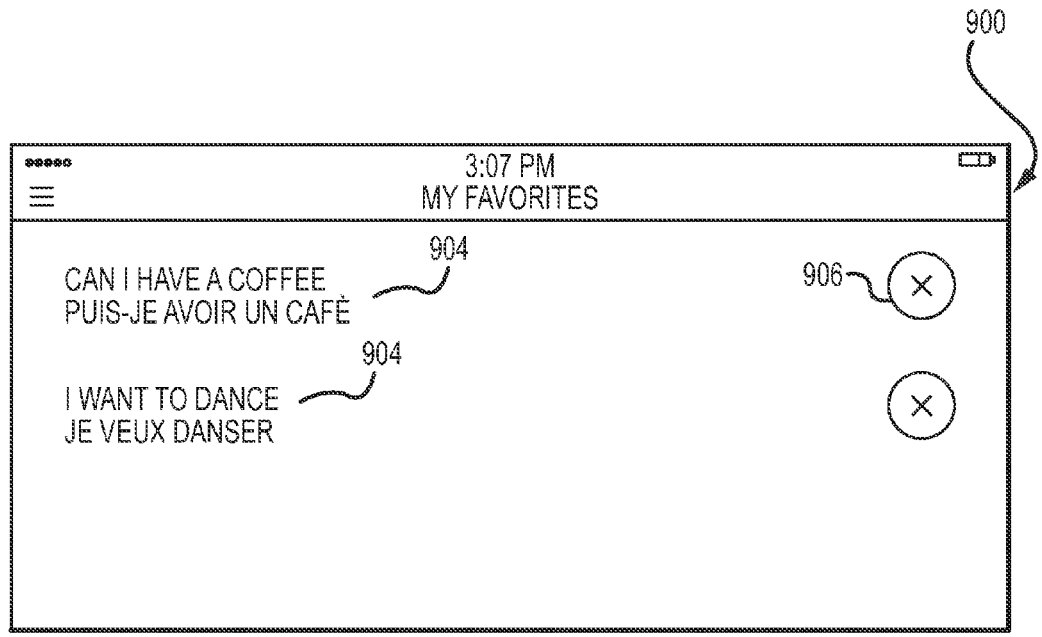
FIG. 9 shows a screenshot of an exemplary favorites user interface according to an embodiment of the invention.

Now turning to FIG. 9, shown is a favorite phrase user interface 900. If a user wishes, he or she may indicate to the phrase building engine 124 that a particular phrase is a "favorite" phrase. In response, the phrase building engine 124 may store the phrase (e.g., in the computer readable medium 124 and/or the storage 130, or may provide the phrase to the server 150 for storing). In this manner, any number of favorite phrases associated with a particular user may be saved for subsequent reference and/or access. The favorite phrase user interface 900 may include one or more favorite phrase buttons 904, each associated with a different favorite phrase. The particular favorite phrases 904 may be selected by a user. For example, if the user activated the favorites button 606 on the final phrase interface 600 (see FIG. 8A), then the phrase building engine 124 will store the displayed final phrase 602 as a favorite phrase associated with the user (see FIG. 9, showing "I want to dance. Je veux danser" as a favorite phrase 904). From the favorite phrase user interface 900, a user can select a favorite phrase button 904 (e.g., by tapping on the favorite phrase 904), which may cause the phrase building engine 124 to present a final phrase user interface 600 for the particular favorite phrase 904. For example, as shown in FIG. 9, a user may select "I want to dance" 904, which may cause the phrase building engine 124 to present the final phrase user interface 600 as it is shown in FIG. 8A. The favorite phrase user interface 900 may include remove buttons 906 to allow a user to remove a favorite phrase 904 from the interface 900 (e.g., so that the phrase building engine 124 discontinues storing the phrase as being a favorite phrases associated with the user).

Figure 10:
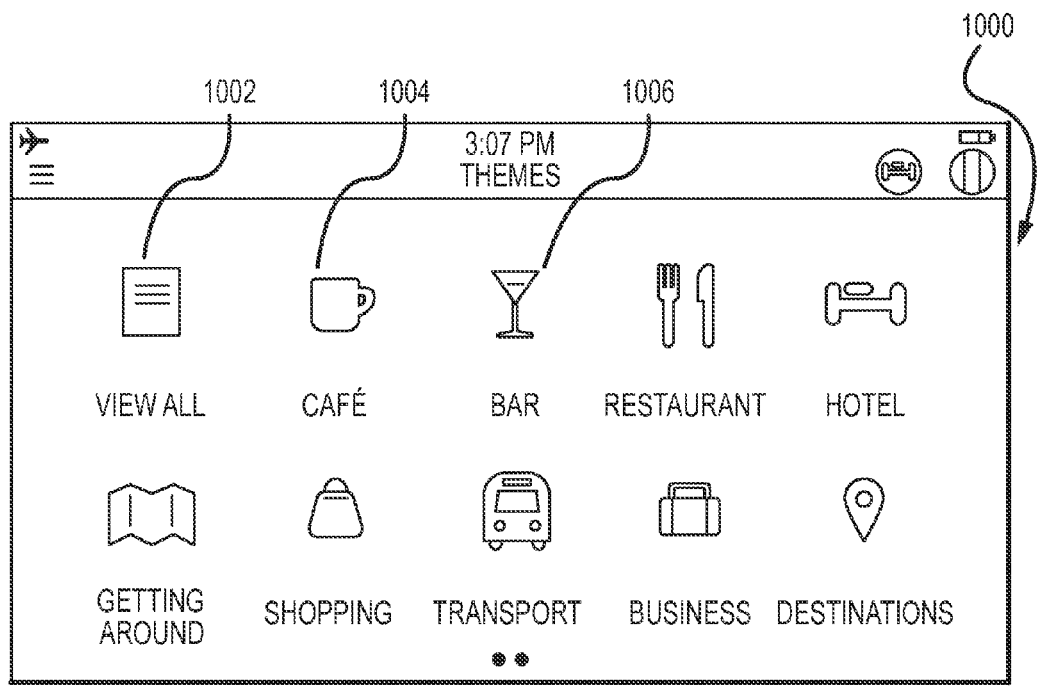
FIG. 10 shows a screenshot of an exemplary themes user interface according to an embodiment of the invention.

FIG. 10 shows a themes user interface 1000 showing a plurality of theme buttons 1002, 1004, 1006 selectable by a user. The executable instructions for applying themes divides the application's content into sub-categories, for example, café, bar, hotel, transport etc. This allows users to select a 'Theme' relevant to the phrase she wishes to build. Once selected, only terms relevant to that particular 'Theme' will be displayed, for example, in the first, second, and/or third pluralities of native terms 508, 510, 516, thus curating the content for the user, and improving the user experience by reducing the search/scroll requirement. The user also has the option to disable 'Themes' feature by selecting 'View All' which will display all terms in alphabetical order.

In some examples, the terms included in the pluralities of native terms (e.g., 508, 510, 516) may focus on every day, conversational, useful phrases. In some examples, embodiments may include pre-determined terms that relate to everyday situations for both business and leisure travelers. Users can build phrases including but not limited to:
Can I see the menu?
Can I have the check?
Can I speak with X?
I want to make an appointment
I want to cancel my reservation
I have to change my reservation
I have to buy a ticket
I'm going to buy a ticket
I'm going to rent a car The themes functionality may further include optional additional segments of language. Users associated with a specific niche such as self-catering travel or extreme sports, or associated with specific areas of industry, such as finance or customer service, may select specific segments of relevant vocabulary to be included. In some embodiments, users may have the ability to select additional niche sub-categories and add those terms to the application database.

Niche categories identified by the application may be stored in the language specific database and identified by data tags. Relevant terms may be retrieved when a user selects a particular 'Theme' and displayed accordingly. In each niche category, each term may have a data-tag that associates it with that particular 'Theme.'

Figure 11:
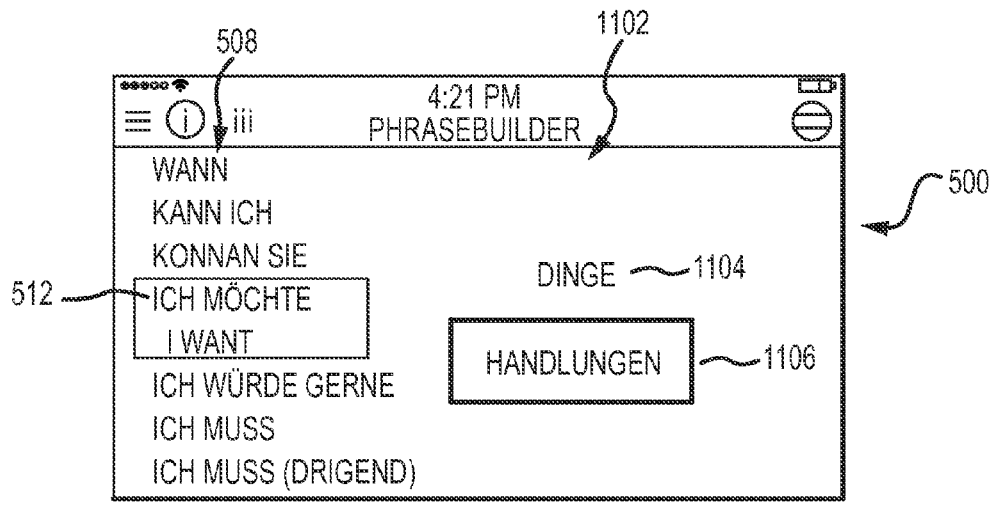
FIGS. 11-12B show screenshots of exemplary user interfaces during the phrasebuilding stage according to one or more embodiment of the invention.

FIG. 11 shows a phrasebuilding user interface 500 implementing further processing steps for enforcing grammar. Particularly, FIG. 11 shows the phrase building engine 124 building a phrase, implementing German as the native language and English as the target language. As shown, the exemplary German speaking user has selected a first native term 512 ("Ich Mochte," which translated into English as "I want") from the first plurality of native language terms 508. The phrase building engine 124 establishes that the first native term 512 is compatible with more than one word classes, as the next term in the phrase could be a noun or a verb. For example, while "I want to order" in German is "Ich mochte bestellen," when using a noun, the noun is placed before the verb. Thus, "I want to order a beer" in German is "Ich mochte ein Bier bestellen." Thus, upon the user selecting the first native term 512, the phrase building engine presents a plurality of word classes 1102. For example, FIG. 11 shows the two word classes 1102, namely noun ("dinge" in German) 1104 and verb ("handlungen" in German). When a user selects a word class, then the phrase building engine will present a plurality of native language terms within the word class 1106, For example, if noun ("handlungen") is selected, then the phrase building interface 500 will display appropriate verbs to finish the phrase. In some embodiments, if the user selects verb ("handlungen") 1106, then the phrase building engine will determine that no noun is required (e.g., the phrase could be as simple as 'I want to pay'), and so the phrase building engine 124 will not display a third plurality of native terms. For example, upon the user selecting "ich mochte" and then the verb, the phrase building engine 124 may automatically present the final phrase user interface 600.

In some embodiments, the phrase building engine 124 may present an indication to the user that terms will switch word order once the final phrase user interface is displayed. For example, if a German speaking user that's translating into English selects a first native term 512 Ich mochte ("I want"), a second native term that is a verein Bier ("beer") and a third native term that is a verb 520 bestellen ("to order") then while the phrase building interface 500 may show it as "I want beer to order," the interface 500 can provide indication that the word order will be switched in the final phrase interface 600, since the final phrase 602 will be presented as "I want to order a beer."

Figure 12A:
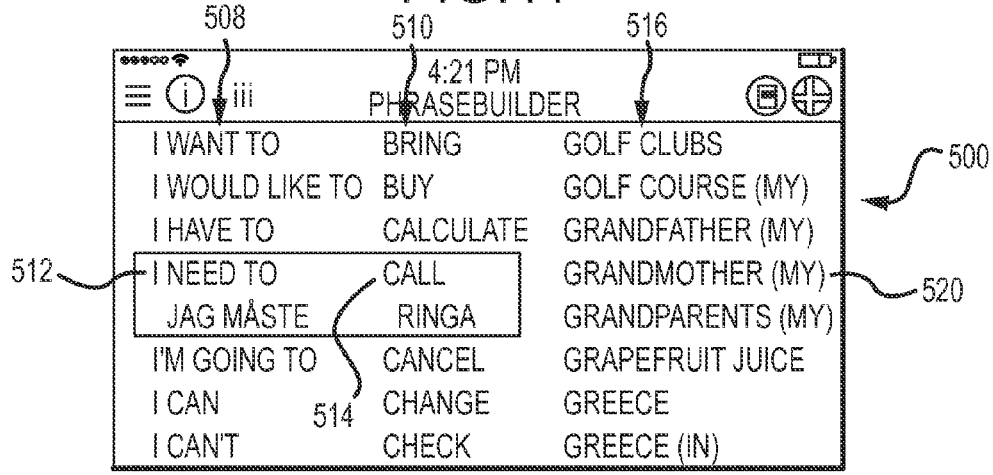
Figure 12B:
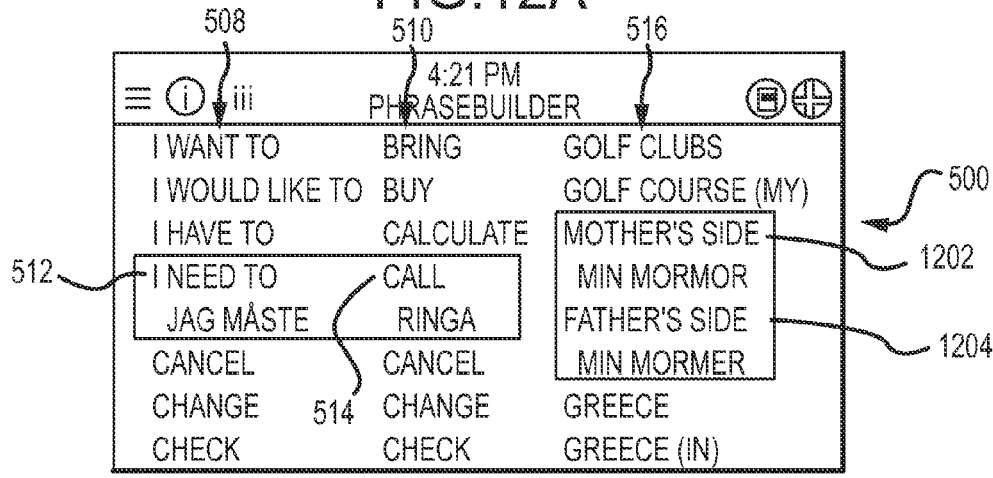

FIGS. 12A and 12B show a phrasebuilding user interface 500 implementing further processing steps for enforcing grammar. Particularly, FIGS. 12A and 12B show the phrase building engine 124 building a phrase, implementing English as the native language and Swedish as the target language. As shown, the exemplary English speaking user has selected a first native term 512 ("I need to") and a second native term 514 ("call"). When the user selects "grandmother (my)" as a third native term 520 from the third plurality of terms 516, the phrase building engine 124 determines that there is more than one correct translation of the term 520. The Swedish language has a term for grandmother on one's mother's side ("min mormor") that is different than the term for grandmother on one's father's side ("min mormer"). Thus, when the user selects "grandmother (my)" as a third native term 520, the phrase building engine 124 causes both translations to appear on the phrasebuilding user interface 500. The user can then select "mother's side" 1202 or "fathers side" 1204, in order to build a phrase that is grammatically correct in Swedish.

Grammatical rules (such as those described above with reference to FIGS. 11, 12B, and 12B) which may be used to ensure grammatically correct translations, may be stored on a language specific, term specific basis. The phrase building engine 124 can enforce a unique set of grammatical rules and 'rules of behavior' for each language. In some embodiments, grammatical rules may be retrieved based on user selection process. For example, as described above with reference to FIGS. 11, 12A, and 12B, selection of a particular term may result in a qualification requirement. For example, if a user selects term, the phrase building engine may require the user to qualify his or her intent, and/or the intended word if there is cause for grammatical duplication issues in the target language. The phrase building engine may use the simple and user-friendly phrasebuilding user interface 500 to display any or all options which the user then selects with one tap, to qualify the intent of the phrase in order to return and "enforce grammar" correctly. In some embodiments, grammatical rules are stored by the application and only deployed (used) when triggered by a particular series of term selections that require grammatical intervention. These rules may be linked to relevant terms as data tags and specific True/False scenarios.

Figure 13:
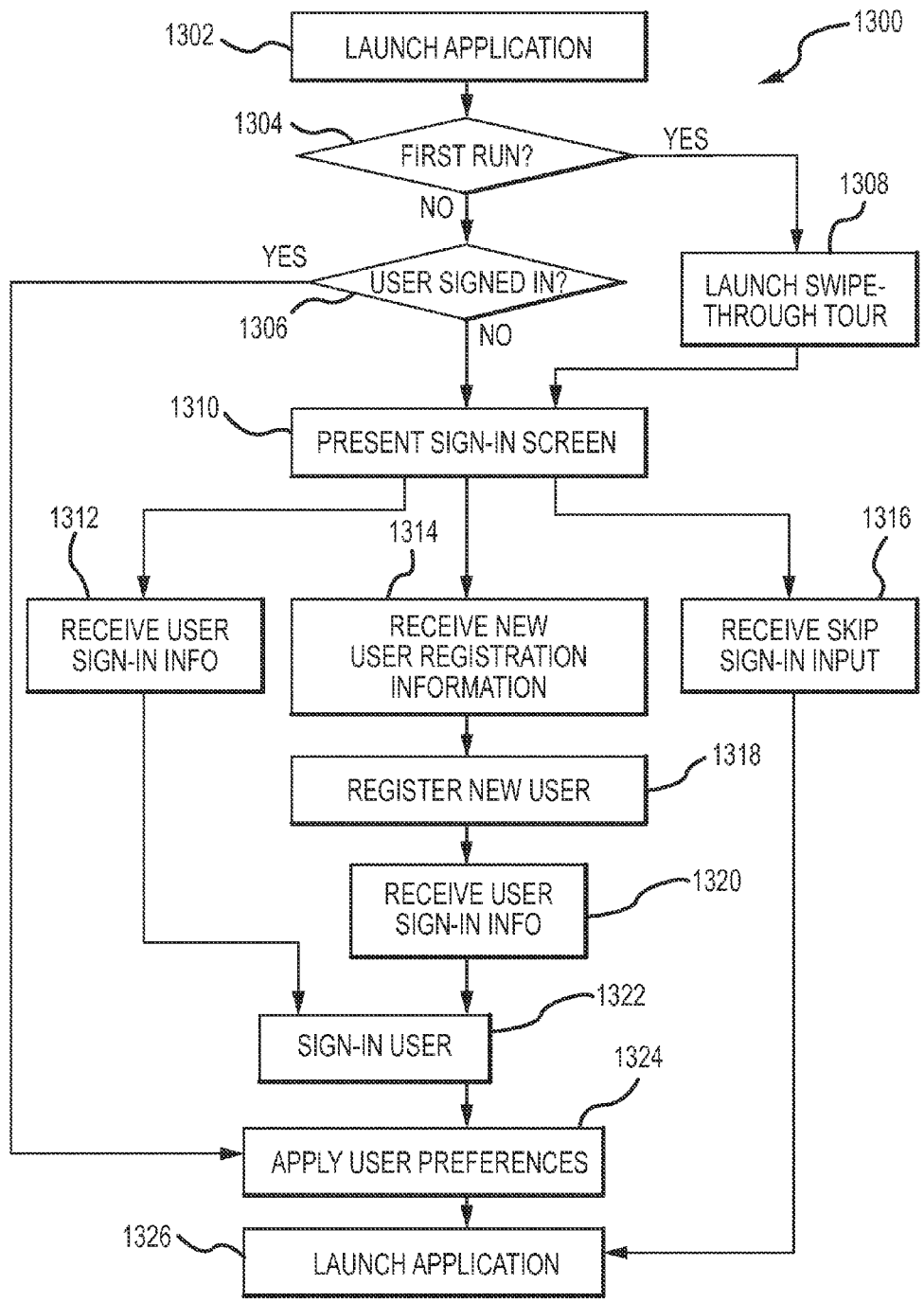
FIG. 13 is a flowchart showing an exemplary sign-in stage for an exemplary phrasebuilding processing according to an embodiment of the invention.

FIG. 13 is a flowchart showing an exemplary sign-in stage for an exemplary phrasebuilding processing according to an embodiment of the invention. In step 1302, the phrase building application is launched 1302. In step 1304, the phrase building engine determines whether it is a first run of the application on the user device 120. If it is a first run (e.g., if it is a user's first time using the application), then the phrase building engine 124 launches a swipe-through tour in step 1308. If in step 1304 the phrase building engine 124 determines it is not a first run, then in step 1306 the phrase building engine 124 determines whether the user is signed in. If the phrase building engine 124 determines that the user is already signed in (for example, a user may remain signed into the application), then in step 1324 the phrase building engine 124 applies the user's preferences (e.g., the user's native language, the user's favorite phrases, etc.) and in step 1326 launches the phrase building application. If in step 1306 the phrase building engine 124 determines the user is not signed in, then in step 1310 the phrase building engine 124 presents a sign-in user interface. If the phrase building engine 124 receives, from the sign-in user interface, user sign-in information in step 1312, then the phrase building engine 124 signs in the user in 1322, applies the user's preferences in step 1324, and launches the application 1326 implementing the user's preferences. If the phrase building engine 124 receives, from the sign-in user interface, new user registration information in step 1314, then the phrase building engine 124 registers the user 1318, receives the user's sign-in information (e.g., email and password) 1320, signs in the user 1322, applies the user's preferences 1324, and launches the phrase building application 1326 implementing the user's preferences. If the phrase building engine 124 receives, from the sign-in user interface, input indicating that the user wants to skip the sign-in phase, then the phrase building engine 124 launches the phrase building application 1326 without implementing user preferences.

Figure 14A:
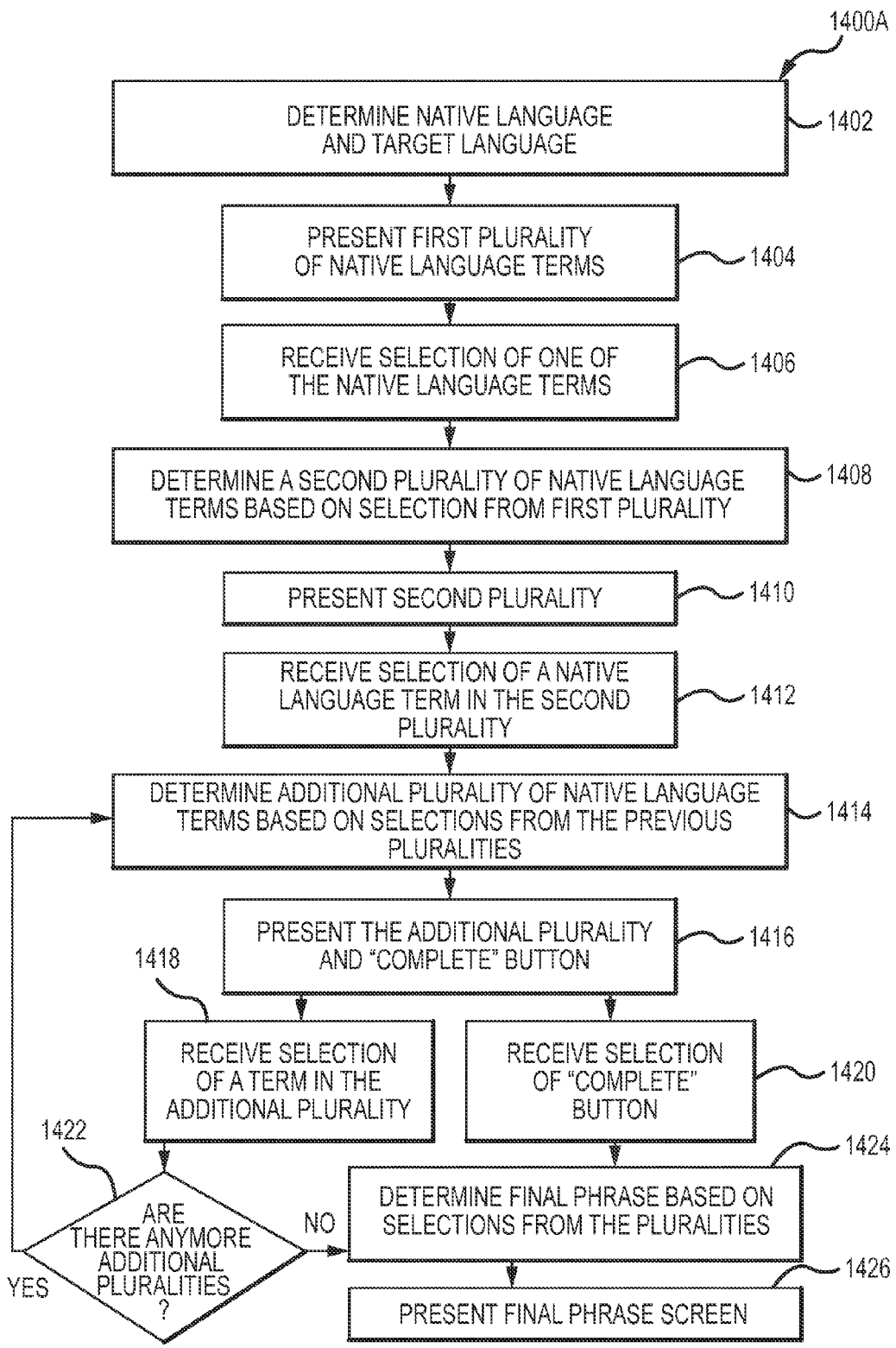
FIG. 14A is a flowchart showing an exemplary phrasebuilding processing according to an embodiment of the invention.

FIG. 14A is a flowchart showing an exemplary phrase-building processing 1400A according to an embodiment of the invention. In step 1402, the phrase building engine 124 determines a native language and target language associated with the user. The phrase building engine 124 may determine the user's native language by retrieving the user's user preferences. The phrase building engine 124 may require the user to select and/or confirm a native language. The phrase building engine 124 may determine the user's target language by retrieving the user's user preferences. The phrase building engine 124 may require the user to select and/or confirm a target language, for example, using the language selection user interface 300. In step 1404, the phrase building engine 124 presents a first plurality of native language terms. In step 1406, the phrase building engine 124 receives a selection (e.g., from the phrasebuilding user interface 500) of one of the native language terms in the first plurality. In step 1408, the phrase building engine 124 determines a second plurality of native language terms based on the selection from the first plurality. The second plurality of native language terms may be selected based on their grammatical compatibility with the selection from the first plurality. For example, phrase building engine 124 may determine the second plurality of native terms 510 according to hierarchies, which may be based on the structural rules and/or policies governing the linguistics of the native language. In step 1410, the phrase building engine 124 presents the second plurality of native language terms. In step 1412, the phrase building engine 124 receives a selection of one of the native language terms in the second plurality. In step 1414, the phrase building engine 124 determines an additional plurality of native language terms based on the based on the selection in step 1406 of the first plurality and the selection in step 1412 of the second plurality. For example, phrase building engine 124 may determine the additional plurality of native terms according to hierarchies, which may be based on the structural rules and/or policies governing the linguistics of the native language. In step 1416, the phrase building engine 124 presents the additional plurality of native language terms and a complete button, and waits to receive user input. If the phrase building engine 124 receives selection of the complete button in step 1420, then in step 1424 the phrase building engine 124 determines a final phrase based on the selection in step 1406 of the first plurality and the selection in step 1412 of the second plurality. The final phrase may be determined based on grammatical rules accessed by the phrase building engine 124. If the phrase building engine 124 receives selection of a term in the additional plurality in step 1418, then in step 1422 the phrase building engine 124 determines whether there are any further additional pluralities. If the phrase building engine 124 determines that there are more additional pluralities, then the phrase building engine 124 returns to step 1414. If the phrase building engine 124 determines that there are not any more additional pluralities, then in step 1424 the phrase building engine 124 determines the final phrase in the target language based on the selection in step 1406 of the first plurality, the selection in step 1412 of the second plurality, and the selection(s) in step 1418 of however many additional pluralities there were. In step 1426, the phrase building engine 124 presents the final phrase in the target language on a final phrase screen (e.g., the final phrase interface 600).

Figure 14B:
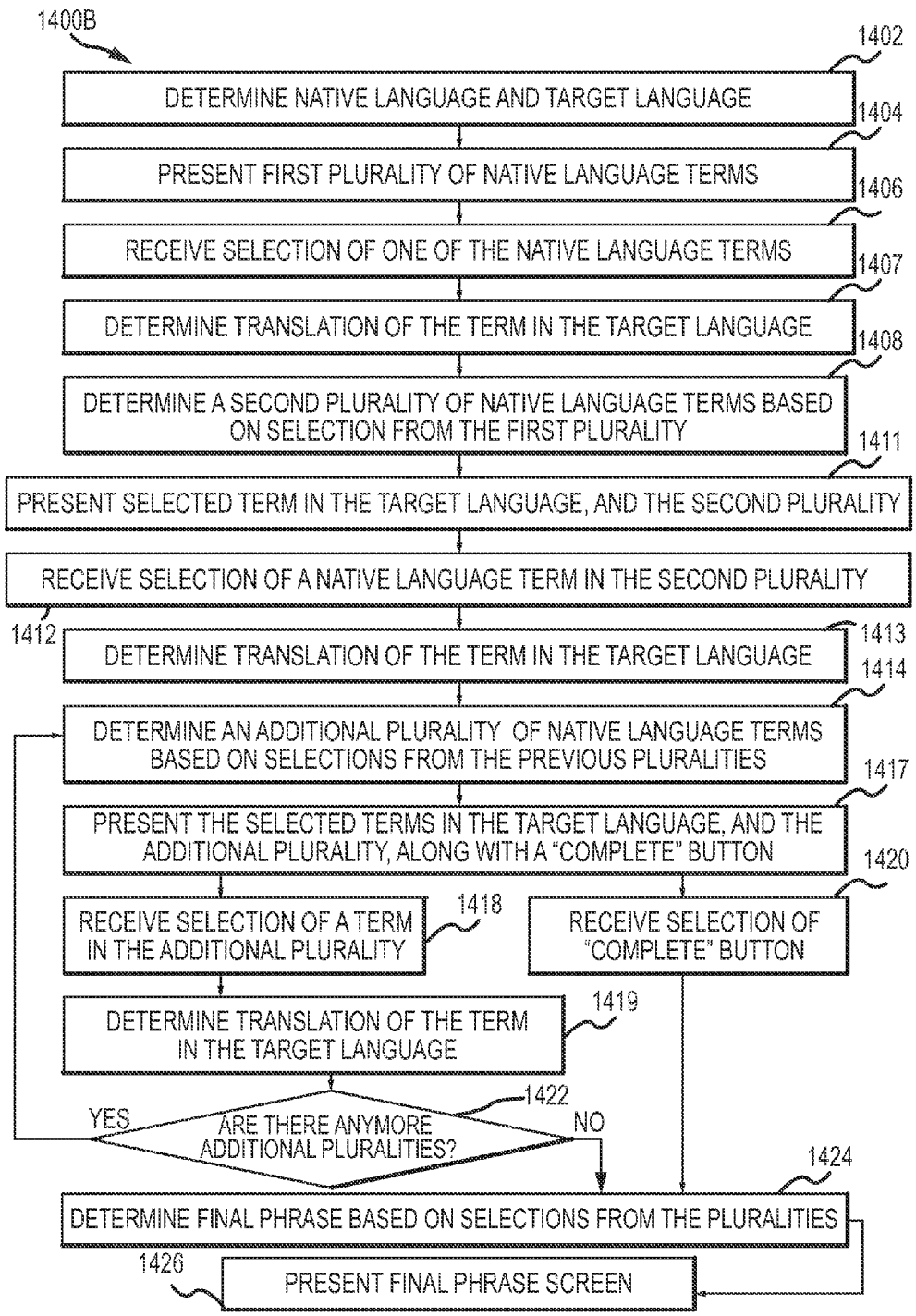
FIG. 14B is a flowchart showing another exemplary phrasebuilding processing according to an embodiment of the invention.

FIG. 14B is a flowchart showing another exemplary phrasebuilding processing 1400B according to an embodiment of the invention. In step 1402, the phrase building engine 124 determines a native language and target language associated with the user. The phrase building engine 124 may determine the user's native language by retrieving the user's user preferences. The phrase building engine 124 may require the user to select and/or confirm a native language. The phrase building engine 124 may determine the user's target language by retrieving the user's user preferences. The phrase building engine 124 may require the user to select and/or confirm a target language, for example, using the language selection user interface 300. In step 1404, the phrase building engine 124 presents a first plurality of native language terms. In step 1406, the phrase building engine 124 receives a selection (e.g., from the phrasebuilding user interface 500) of one of the native language terms in the first plurality. In step 1407, the phrase building engine 124 determines a translation of the first term in the target language. In step 1408, the phrase building engine 124 determines a second plurality of native language terms based on the selection from the first plurality. For example, phrase building engine 124 may determine the second plurality of native terms according to hierarchies, which may be based on the structural rules and/or policies governing the linguistics of the native language. In step 1411, the phrase building engine 124 presents the translation of the first term in the target language and a second plurality of native language terms. In step 1412, the phrase building engine 124 receives a selection of one of the native language terms in the second plurality. In step 1413, the phrase building engine 124 determines a translation of the second term in the target language. In step 1414, the phrase building engine 124 determines an additional plurality of native language terms based on the based on the selection in step 1406 of the first plurality and the selection in step 1412 of the second plurality. For example, phrase building engine 124 may determine the additional plurality of native terms according to hierarchies, which may be based on the structural rules and/or policies governing the linguistics of the native language. In step 1417, the phrase building engine 124 presents the translation of the second term in the target language and an additional plurality of native language terms and a complete button, and waits to receive user input. If the phrase building engine 124 receives selection of the complete button in step 1420, then in step 1424 the phrase building engine 124 determines a final phrase based on the selection in step 1406 of the first plurality and the selection in step 1412 of the second plurality. If the phrase building engine 124 receives selection of a term in the additional plurality in step 1418, then in step 1419 the phrase building engine 124 determines a translation of the additional term in the target language. In step 1422 the phrase building engine 124 determines whether there are any further additional pluralities. If the phrase building engine 124 determines that there are more additional pluralities, then the phrase building engine 124 returns to step 1414. If the phrase building engine 124 determines that there are not any more additional pluralities, then in step 1424 the phrase building engine 124 determines the final phrase in the target language based on the selection in step 1406 of the first plurality, the selection in step 1412 of the second plurality, and the selection(s) in step 1418 of however many additional pluralities there were. In step 1426, the phrase building engine 124 presents the final phrase in the target language on a final phrase screen (e.g., the final phrase interface 600).

Figure 15:
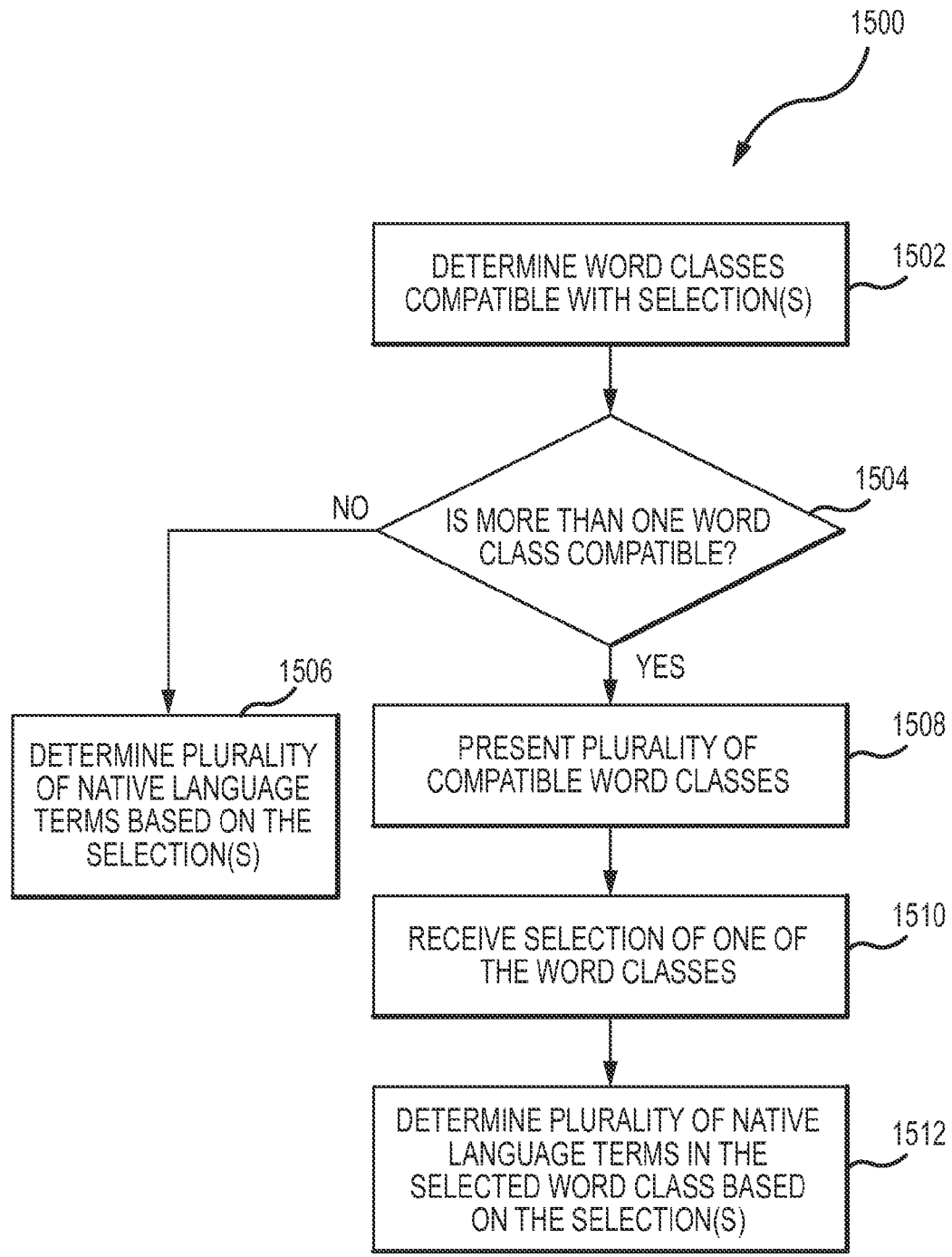
FIG. 15 is a flowchart showing further exemplary steps for a phrasebuilding processing according to an embodiment of the invention.

FIG. 15 is a flowchart showing further exemplary steps for a phrasebuilding processing 1500 according to an embodiment of the invention. For example, the steps shown in FIG. 15 can be implemented when translating from German to English, as described with reference to FIG. 11. These steps may be carried out by the phrase building engine 124 upon determining that they are needed to properly translate a particular native language to a particular target language. For example, the phrase building engine 124 may implement these steps upon establishing that the native language is German and the target language is English, but may not implement these steps upon establishing that the native language is French and the target language is English. Languages with more complex grammar structures, or more intricate and specific vocabulary rules, will require additional steps. This applies to languages including but not limited to Swedish, Dutch, Filipino (Tagalog) and all Asian languages. The phrase building engine 124 may account for idiosyncrasies for each language and incorporate language specific rules for 'enforcing grammar' correctly into each phrase.

In step 1502, the phrase building engine 124 determines word classes that are compatible with a user selection (e.g., of a first native term 512). In step 1504, the phrase building engine 124 determines whether or not more than one word class (e.g., verb, noun, etc.) is compatible. If only one word class is compatible with the selected native term, then in step 1506 the phrase building engine 124 determines a next plurality of native terms based on the user selection. If more than one word class is compatible, then in step 1508 the phrase building engine 124 presents a plurality of the compatible word classes to the user and waits for user input. In step 1510 the phrase building engine 124 receives user input indicating a word class. In step 1512, the phrase building engine 124 determines a next plurality of native terms within the word class based on the user selection.

Figure 16:
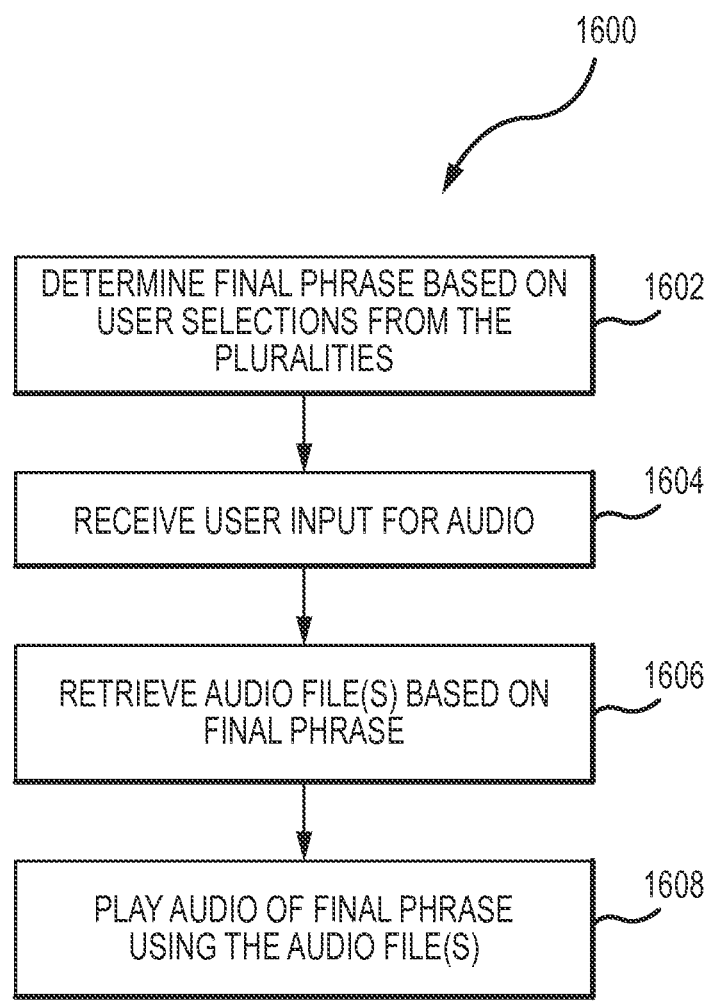
FIG. 16 is a flowchart showing audio presentation processing according to an embodiment of the invention.

FIG. 16 is a flowchart showing audio presentation processing 1600 according to an embodiment of the invention. In step 1602 the phrase building engine 124 determines a final phrase in a target language based on user selections from pluralities of native language terms. In step 1604, the phrase building engine 124 receives user input indicating that the user would like an audio recording of the final phrase to be played (e.g., a user activating the audio button 604, as described above). In step 1606, the phrase building engine 124 retrieves one or more audio file based on the final phrase. In step 1608 the phrase building engine 124 plays audio of the final phrase in the target language using the audio files.

Examples of the present invention are advantageous in many respects. A user can toggle between multiple languages, thus making it more user-friendly and appropriate for frequent travelers. All grammar can be built into the phrase building engine such that a user does not need to think about grammatical errors or worry about verb conjugation.

Examples of the present invention advantageously permit a user to see each term being translated as the phrase is built, allowing the user to better understand the translation performed by the phrase building engine. Examples of the present invention further permit a user to see text of terms and/or phrases phonetically, thus aiding with correct pronunciation. In addition, the invention permits the user to hear speakers (e.g., native speakers) pronounce generated phrases.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A phrase building system including at least one processing unit and a memory, the memory encoded with executable instructions that, when executed by the at least one processing unit, cause the at least one processing unit to:
   cause a plurality of first native terms in a native language to be displayed on a screen;
   based on a user selection of a first native term of the plurality of first native terms:
      translate the first native term into a first target term in a target language, and
      use grammatical rules to determine a plurality of second native terms that are grammatically compatible with the first native term;
   cause the plurality of second native terms to be displayed on the screen;
   receive a user selection of a second native term of the plurality of second native terms;
   use the grammatical rules to translate the second native term into a second target term based on the first target term and the second native term;
   build a phrase in the target language based on the first and second target terms, the phrase being grammatically correct in the target language; and
   cause at least one of:
      display of the phrase in the target language on the screen, or
      transmission of an audio recording of the phrase in the target language.

2. The system of claim 1, wherein, in building the phrase, the executable instructions further cause the at least one processing unit to modify at least one of the first target term or the second target term.

3. The system of claim 1, wherein the executable instructions, when executed by the at least one processing unit, further cause the at least one processing unit to:

based on the user selection of the first native term and the second native term, use the grammatical rules to determine a plurality of third native terms that are grammatically compatible with the first native term and the second native term;
receive a user selection of a third native term of the plurality of third native terms; and
use the grammatical rules to translate the third native term into a third target term based on the first target term, the second target term, and the third native term;
wherein the phrase is built in the target language based on the first, second, and third target terms.

4. The system of claim 1, wherein, in determining the list of second native terms, the executable instructions further cause the at least one processing unit to:
determine a plurality of compatible word classes that are compatible with the first target term;
cause the plurality of compatible word classes to be displayed on the screen;
based on a user selection of a compatible word class, use the grammatical rules to determine a list of second native terms that are within the selected word class.

5. The system of claim 4, wherein the executable instructions, when executed by the at least one processing unit, further cause the at least one processing unit to determine, based on the selected word class, whether or not to generate a list of third native terms.

6. The system of claim 1, wherein the executable instructions, when executed by the at least one processing unit, further cause the at least one processing unit to cause the first target term to be displayed along with the second plurality of native terms.

7. The system of claim 1, wherein the audio recording is stored as a first audio file associated with the first target term and a second audio file associated with the second target term.

8. The system of claim 7, wherein the executable instructions, when executed by the at least one processing unit, further cause the at least one processing unit to implement enforcement rules to determine an order of the first audio file and the second audio file.

9. A phrase building system including at least one processing unit and a memory, the memory containing executable instructions that, when executed by the at least one processing unit, cause the at least one processing unit to:
determine a native language and a target language associated with a user;
cause a first plurality of native terms to be displayed on a screen;
receive a selection of a first native term of the first plurality of native terms;
determine a first target term that is a translation of the first native term;
based on the first native term, use grammatical rules to determine a second plurality of native terms that are grammatically compatible with the first native term;
cause the second plurality of native terms to be displayed on the screen,
receive a selection of a second native term of the second plurality of native terms;
determine a second target term that is a translation of the second native term;
based on the first native term and the second native term, use grammatical rules to determine an additional plurality of native terms that are grammatically compatible with the first native term and the second native term;
cause the additional plurality of native terms to be displayed on the screen, along with a completion button; wherein
upon receiving input for the completion button, cause a phrase in the target language to be displayed based on the first target term and the second target term, the phrase being grammatically correct in the target language; and
upon receiving a selection of an additional native term of the additional plurality of native terms:
determine an additional target term that is a translation of the additional native term; and
cause an other phrase to be displayed on the screen based on the first target term, the second target term, and the additional target term, the other phrase being grammatically correct in the target language.

10. The system of claim 9, wherein the executable instructions, when executed by the at least one processing unit, further cause the at least one processing unit to transmit an audio recording of the phrase in the target language.

11. The system of claim 10, wherein the audio recording is stored as a first audio file associated with the first target term and a second audio file associated with the second target term.

12. The system of claim 11, wherein the executable instructions, when executed by the at least one processing unit, further cause the at least one processing unit to implement enforcement rules to determine an order of the first audio file and the second audio file.

13. Non-transitory computer readable media encoded with executable instructions that, when executed by the at least one processing unit, cause the at least one processing unit to:
cause a plurality of first native terms in a native language to be displayed on a screen;
based on a user selection of a first native term:
translate the first native term into a first target term in a target language, and
use grammatical rules to determine a plurality of second native terms that are grammatically compatible with the first native term;
cause the plurality of second native terms to be displayed on the screen;
receive a user selection of a second native term;
use the grammatical rules to translate the second native term into a second target term based on the first target term and the second native term;
build a phrase in the target language based on the first and second target terms, the phrase being grammatically correct in the target language; and
cause at least one of:
display of the phrase in the target language on the screen, or
transmission of an audio recording of the phrase in the target language.

14. The computer readable media of claim 13, wherein the executable instructions, when executed by the at least one processing unit, further cause the at least one processing unit to cause the first target term to be displayed along with the second plurality of native terms.

15. The computer readable media of claim 13, wherein, in building the phrase, the executable instructions further cause the at least one processing unit to modify at least one of the first target term or the second target term.

16. The computer readable media of claim 13, wherein the executable instructions further cause the at least one processing unit to:
  based on the user selection of the first native term and the second native term, use the grammatical rules to determine a plurality of third native terms that are grammatically compatible with the first native term and the second native term;
  receive a user selection of a third native term; and
  use the grammatical rules to translate the third native term into a third target term based on the first target term, the second target term, and the third native term;
  wherein the phrase is built in the target language based on the first, second, and third target terms.

17. The computer readable media of claim 13, wherein, in determining the plurality of second native terms, the executable instructions further cause the at least one processing unit to:
  determine a plurality of compatible word classes that are compatible with the first target term;
  cause the plurality of compatible word classes to be displayed on the screen;
  based on a user selection of a compatible word class, use the grammatical rules determine a plurality of second native terms that are within the selected word class.

18. The computer readable media of claim 13, wherein the audio recording is stored as a first audio file associated with the first target term and a second audio file associated with the second target term.

19. The computer readable media of claim 18, wherein the executable instructions, when executed by the at least one processing unit, further cause the at least one processing unit to implement enforcement rules to determine an order of the first audio file and the second audio file.

20. A method for generating phrases in foreign languages, comprising:
  causing a plurality of first native terms in a native language to be displayed on a screen;
  based on a user selection of a first native term:
    translating the first native term into a first target term in a target language, and
    using grammatical rules to determine a plurality of second native terms that are grammatically compatible with the first native term;
  causing the plurality of second native terms to be displayed on the screen;
  receiving a user selection of a second native term;
  using the grammatical rules to translate the second native term into a second target term based on the first target term and the second native term;
  building a phrase in the target language based on the first and second target terms, the phrase being grammatically correct in the target language; and
  causing at least one of:
    display of the phrase in the target language on the screen, or
    transmission of an audio recording of the phrase in the target language.

21. The method of claim 20, wherein building the phrase comprises modifying at least one of the first target term or the second target term.

22. The method of claim 20, further comprising:
  based on the user selection of the first native term and the second native term, using the grammatical rules to determine a plurality of third native terms that are grammatically compatible with the first native term and the second native term;
  receiving a user selection of a third native term; and
  using the grammatical rules to translate the third native term into a third target term based on the first target term, the second target term, and the third native term;
  wherein the phrase is built in the target language based on the first, second, and third target terms.

* * * * *